US006901657B2

(12) United States Patent
Takada

(10) Patent No.: US 6,901,657 B2
(45) Date of Patent: Jun. 7, 2005

(54) WIRING HARNESS PRODUCTION APPARATUS

(75) Inventor: Kazuhiko Takada, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 311 days.

(21) Appl. No.: 09/791,854

(22) Filed: Feb. 26, 2001

(65) Prior Publication Data

US 2001/0023775 A1 Sep. 27, 2001

(30) Foreign Application Priority Data

Mar. 14, 2000 (JP) ....................................... 2000-070416

(51) Int. Cl.[7] ................................................ B23P 19/00

(52) U.S. Cl. ........................ 29/761; 29/33 M; 29/33 F; 29/742; 29/745; 29/747; 29/748; 29/791; 29/795; 29/857; 29/861; 174/72 A; 174/145; 174/154

(58) Field of Search .............................. 29/33 M, 33 F, 29/742, 745, 746, 747, 748, 749, 791, 793, 792, 794, 857, 861, 865, 866, 867, 868, 869; 174/72 A, 145, 154

(56) References Cited

U.S. PATENT DOCUMENTS 4,464,006 A * 8/1984 Wilt ........................... 439/544

FOREIGN PATENT DOCUMENTS

| | | |
|---|---|---|
| JP | 9-115639 | 5/1997 |
| JP | 10-112229 | 4/1998 |
| JP | 10-154568 | 6/1998 |

* cited by examiner

*Primary Examiner*—Richard Chang
(74) *Attorney, Agent, or Firm*—Armstrong, Kratz, Quintos, Hanson & Brooks, LLP.

(57) ABSTRACT

The wiring harness has a plurality of first sub-harnesses and a plurality of second sub-harnesses. The first sub-harness has a first press-fit terminal joined to each end of a first electrical cable, and the first sub-harness has a first isolator holding the first press-fit terminal. The second sub-harness has a second press-fit terminal, a crimp terminal, a connector housing for accommodating the crimp terminal, and a second isolator supporting the second press-fit terminal. The second press-fit terminal is connected to one end of a second electrical cable, and the crimp terminal is connected to the other end of the second electrical cable. The press-fit terminals held by different ones of the isolators can be connected to one another when any of the first and second isolators are layered. The wiring harness production apparatus has a first sub-harness assembling line, a second sub-harness assembling line, and a wiring harness assembling line for layering any of the first and second isolators of the first and second sub-harnesses to complete the wiring harness. The first and second sub-harnesses are assembled in the first and second sub-harness assembling lines based on an assembling time required for assembling the wiring harness in the wiring harness assembling line.

5 Claims, 18 Drawing Sheets

WIRING HARNESS PRODUCTION APPARATUS

BACKGROUND OF THE INVENTION

1. Field of the Invention

The present invention relates to a production apparatus for a wiring harness arranged in a mobile unit such as a motor vehicle.

2. Related Art

A motor vehicle has a wiring harness for supplying a power to electrical appliances such as various lamps and motors from a battery. A conventional wiring harness includes a plurality of electrical cables, a plurality of terminals each fitted to an end of each electrical cable, connector housings accommodating the terminals, etc.

An ordinary or high grade car has an increasing number of on-vehicle electronics components, which requires hundreds to thousands of electrical cables. Thus, a wiring harness for such a car tends to have an increasing number of electrical cables.

For assembling the wiring harness, a plurality of sub-wiring harnesses which has a plurality of electrical cables and connectors, are assembled. Thereafter, these sub-harnesses are combined with one another to complete the wiring harness. Thus, the wiring harness production line has a plurality of sub-harness assembling lines and a wiring harness assembling line.

For assembling the sub-harness, each sub-harness assembling line press-fits or crimps a terminal to each end of each one of plural electrical cables. If required, the electrical cables are directly connected to one another by crimping or the like. Thereafter, these terminals are received in terminal accommodation chambers of connector housings to assemble the sub-harness.

The wiring harness assembling line combines the sub-harnesses with one another to obtain the wiring harness. The wiring harness assembling line has used, for example, a plurality of wiring boards. The wiring board travels on a circulation course on a floor of a factory and has clips for bundling the electrical cables. On the wiring board, the electrical cables are crimped at predetermined points to arrange the electrical cables and the sub-harnesses to obtain the wiring harness.

However, the conventional wiring harness production line has the plurality of sub-harness production lines which are independent of each other. Thus, each sub-harness production line has a specified time for producing a single sub-harness, and the specified time is different from that of another sub-harness production line.

Some electrical cables of the sub-harnesses are directly connected to each other. Such electrical cables of the sub-harnesses should be once transferred from an automatic assembling line having a known crimping machine to a known joint crimping machine or a conventional resistance welding machine.

The direct connection of the electrical cables varies a time requested for assembling the sub-wiring harnesses. Thus, the sub-harness assembling lines vary from each other in their assembling times.

The wiring harness assembling line needs to stock an amount of the sub-harness. The wiring harness assembling line uses the stocked sub-harnesses to complete the wiring harness, so that the wiring harness assembling line receives an appropriate number of the sub-harnesses in consideration of the work progress.

Therefore, the conventional wiring harness production apparatus requires a space for stocking the sub-harnesses in the wiring harness assembling line. This tends to increase an installation space of the apparatus in a factory. Furthermore, the stock of the sub-harnesses in the wiring harness assembling line may be undesirable for the reliability of the sub-harnesses. The decreased reliability of the sub-harnesses has an adverse effect on the wiring harness.

SUMMARY OF THE INVENTION

Accordingly, an object of the present invention is to provide a wiring harness production apparatus having a decreased installation space.

For achieving the object, the present invention provides an apparatus for producing a wiring harness. The wiring harness has a plurality of first sub-harnesses and a plurality of second sub-harnesses. The first sub-harness has a plurality of electrical cables, a plurality of first press-fit terminals, and a first isolator. The first press-fit terminal is joined to each end of the first electrical cable. The first isolator holds the first press-fit terminals positioned at one end of the first sub-harness. The second sub-harness has a plurality of second electrical cables, a plurality of second press-fit terminals, a plurality of crimp terminals, a connector housing for accommodating the crimp terminals, and a second isolator supporting the second press-fit terminals. The second press-fit terminal is connected to one end of the second electrical cable, and the crimp terminal is connected to the other end of the second electrical cable. When any of the first and second isolators are layered, the press-fit terminals held by different ones of the isolators can be connected to one another. The apparatus includes:

a first sub-harness assembling line for assembling the first sub-harnesses, a second sub-harness assembling line for assembling the second sub-harnesses, and a wiring harness assembling line for layering the isolators of the first and second sub-harnesses to complete the wiring harness. The first and second sub-harnesses are assembled in the first and second sub-harness assembling lines based on an assembling time required for assembling the wiring harness in the wiring harness assembling line.

Preferably, the wiring harness assembling line outputs one of the wiring harnesses at a time interval, and the first and second sub-harness assembling lines can output a specified number of the first and second sub-harnesses within the time interval. The specified number of the sub-harnesses are required to assemble the wiring harness. Thus, the first and second sub-harness assembling line allows to output the first and second sub-harnesses to the wiring harness assembling line in synchronization with the assembling speed of the wiring harness.

Preferably, the first sub-harness assembling line takes a first time required for assembling a first number of the first sub-harnesses required to assemble the single wiring harness, and the second sub-harness assembling line takes a second time required for assembling a second number of the second sub-harnesses required to assemble the single wiring harness. The time interval is determined based on a longer one of the first and second times. The first and second sub-harness assembling lines allow to output the first and second sub-harnesses to the wiring harness assembling line in a sure synchronization with the assembling speed of the wiring harness.

Preferably, the first time is substantially equal to the time interval, and the second time is also substantially equal to the time interval.

In the above-mentioned aspect of the invention, the first and second sub-harnesses are assembled based on a time required for assembling a single wiring harness. Thus, the first and second sub-harnesses are supplied from the first and second sub-harness assembling lines to the wiring harness assembling line in conformity with the assembling of the wiring harness.

Accordingly, it is unnecessary to stock a larger amount of the sub-harnesses near the wiring harness assembling line. This allows a reduced space for stocking the sub-harnesses near the wiring harness assembling line, reducing the total space for the wiring harness production apparatus.

Preferably, the first and second sub-harness assembling lines assemble the first or second sub-harness while the first and second electrical cable are being transferred to come near the wiring harness assembling line.

In this aspect of the invention, when the sub-harnesses have been just assembled, they are located near the wiring harness assembling line. This allows an efficient transfer of the sub-harnesses for the wiring harness assembling line. That is, the sub-harnesses can be smoothly supplied to the wiring harness assembling line. Accordingly, an assembling time for the wiring harness is reduced, allowing an improved productivity of the wiring harness.

DETAILED DESCRIPTION OF THE PREFERRED EMBODIMENT

Next, referring the accompanied drawings, a wiring harness production apparatus of an embodiment according to the present invention will be discussed. A wiring harness production apparatus 200 illustrated in FIG. 1 produces a wiring harness 1, for example, illustrated in FIG. 7.

Figure 7:
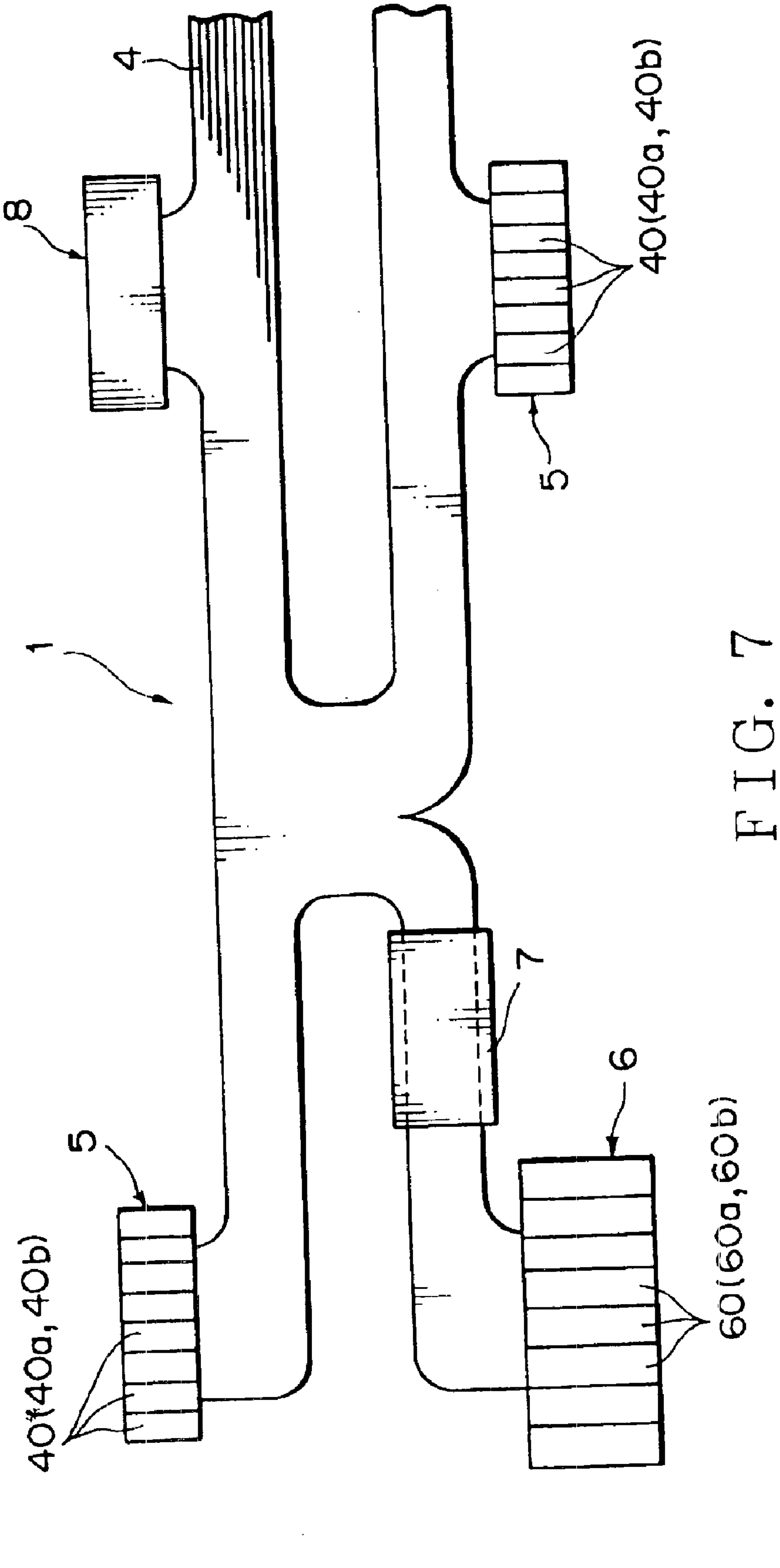
FIG. 7 is a view illustrating a concept of a wiring harness assembled by the wiring harness production apparatus of FIG. 1.

The wiring harness 1 illustrated in FIG. 7 is arranged in a motor vehicle to supply a power from a power source like a battery to on-vehicle electric appliances such as various lamps and various motors.

As illustrated in FIG. 7, the wiring harness 1 has a lot of electrical cables 4, connectors 5, an electrical distribution block 6, a connector 8, and other fittings like a protector 7. Each electrical cable 4 is an insulated one having a conductive wire core and an insulating sheath that covers the core. A plurality of the protectors 7 are provided at appropriate positions to adequately secure the electrical cables 4.

Figure 20:
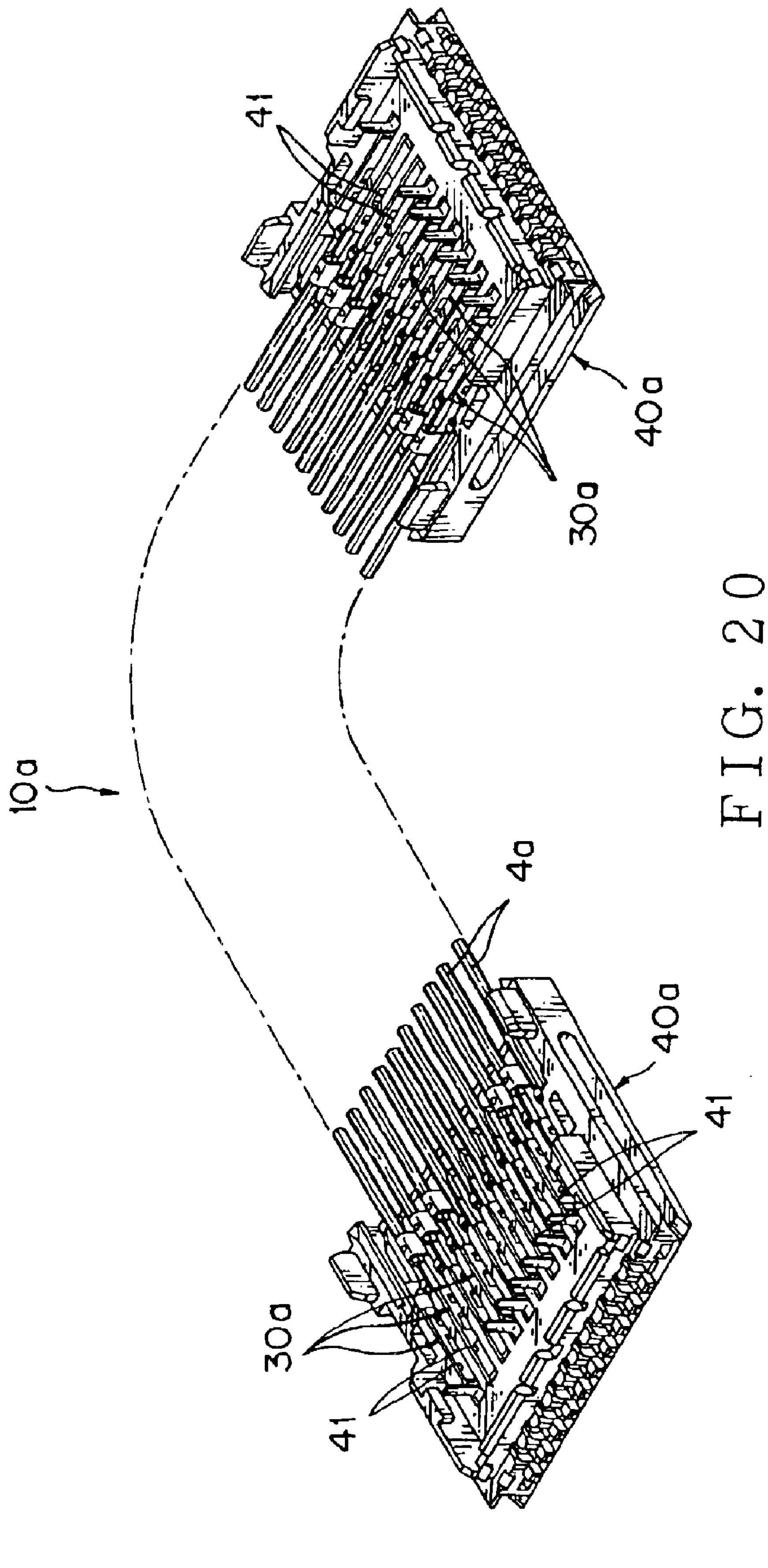
FIG. 20 is a perspective view showing an example of a sub-harness of the wiring harness shown in FIG. 7, and the sub-harness has a press-fit terminal at each end thereof.
Figure 21:
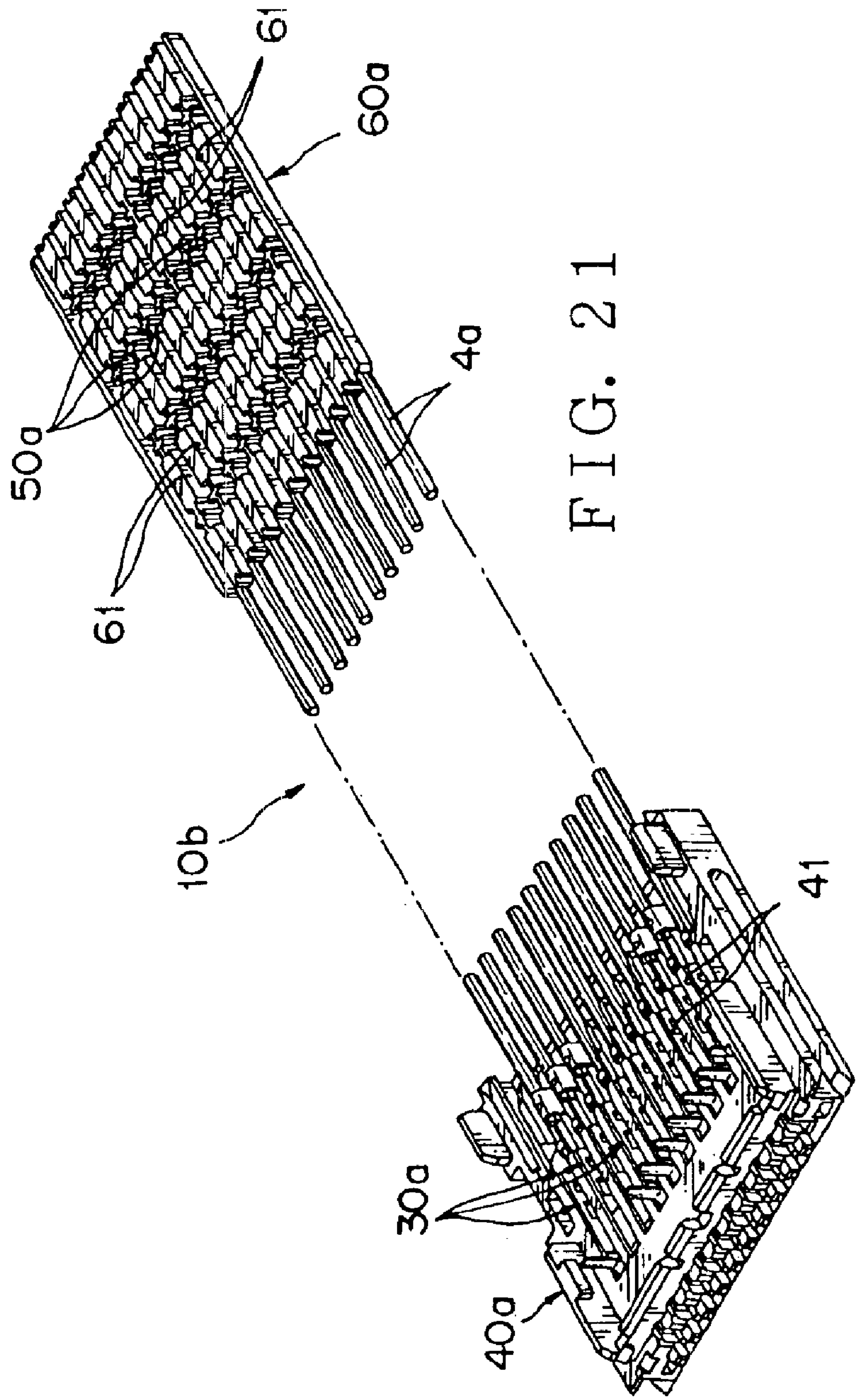
FIG. 21 is a perspective view showing another example of a sub-harness of the wiring harness shown in FIG. 7, and the sub-harness has a press-fit terminal at each end thereof.
Figure 22:
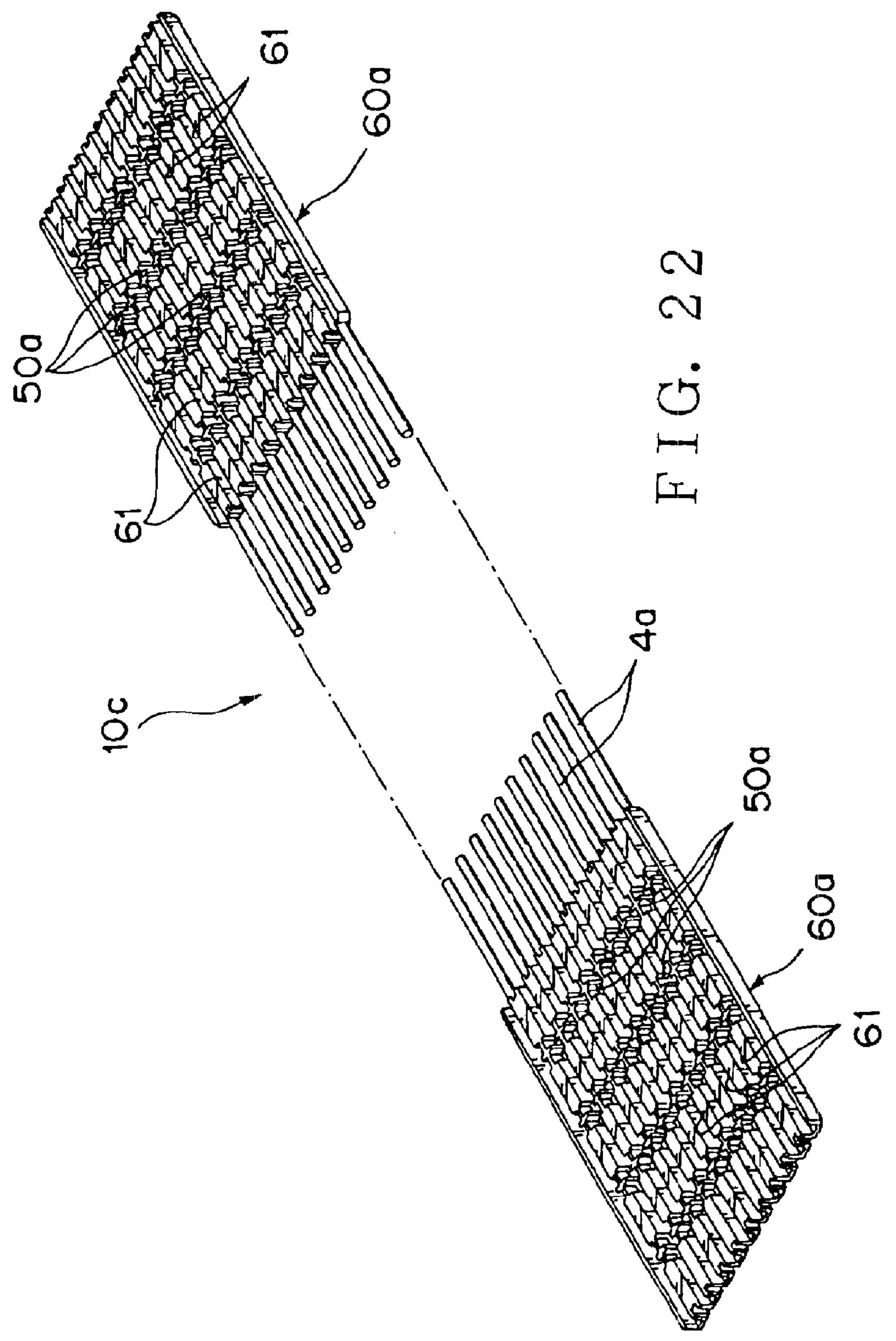
FIG. 22 is a perspective view showing further another example of a sub-harness of the wiring harness shown in FIG. 7, and the sub-harness has a press-fit terminal at each end thereof.

The wiring harness 1 has at least one type of sub-harnesses freely selected from sub-harnesses 10*a*, 10*b*, and 10*c* each having a press-fit terminal at each end as illustrated in FIGS. 20 to 22. The wiring harness 1 may have more than one of the sub-harnesses 10*a*, 10*b*, and 10*c*.

That is, the wiring harness 1 may have any of the sub-harnesses 10*a*, 10*b*, and 10*c*.

Figure 23:
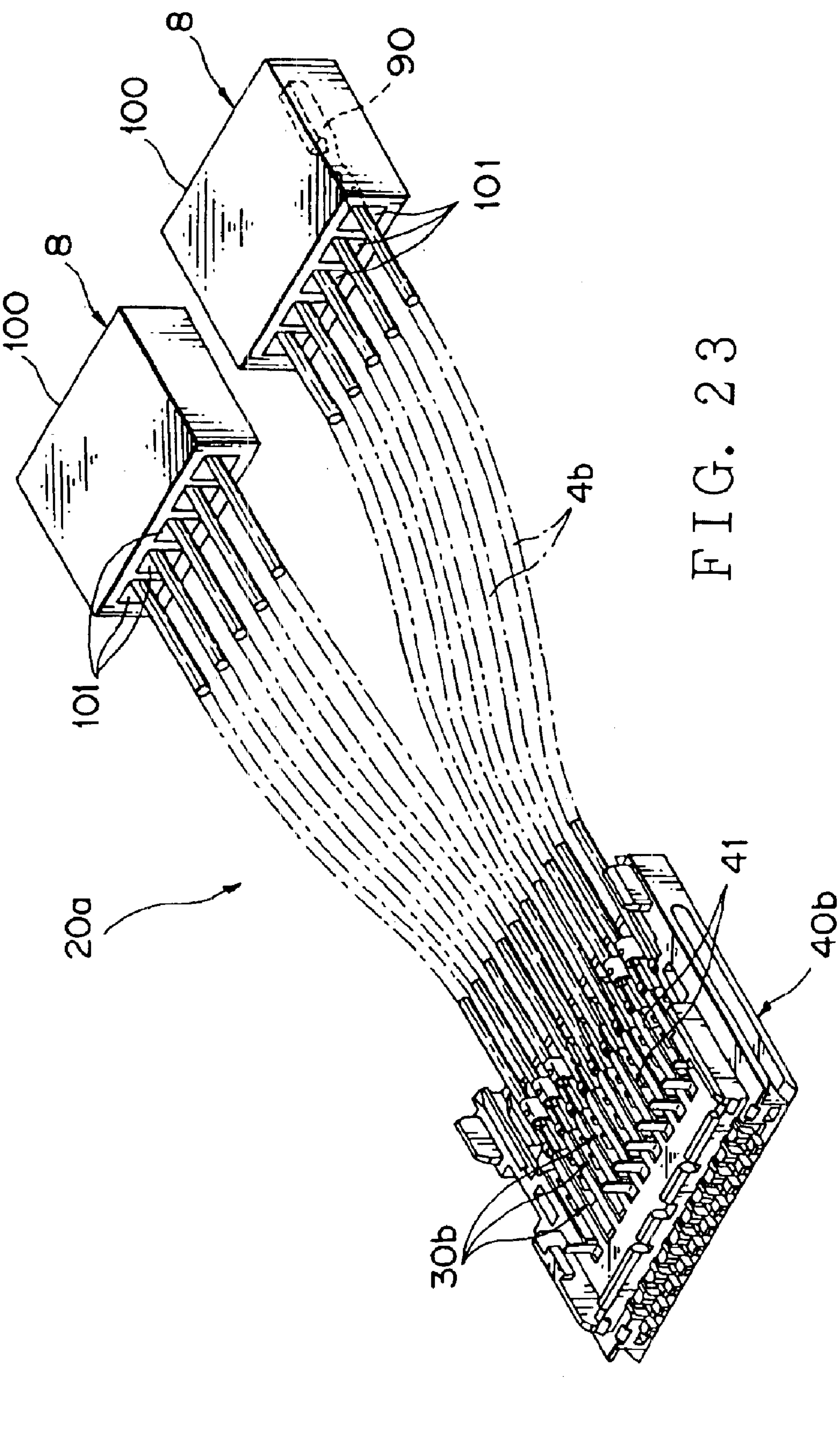
FIG. 23 is a perspective view showing an example of a sub-harness of the wiring harness shown in FIG. 7, and the sub-harness has a press-fit terminal at one end and a crimp terminal at the other end.
Figure 24:
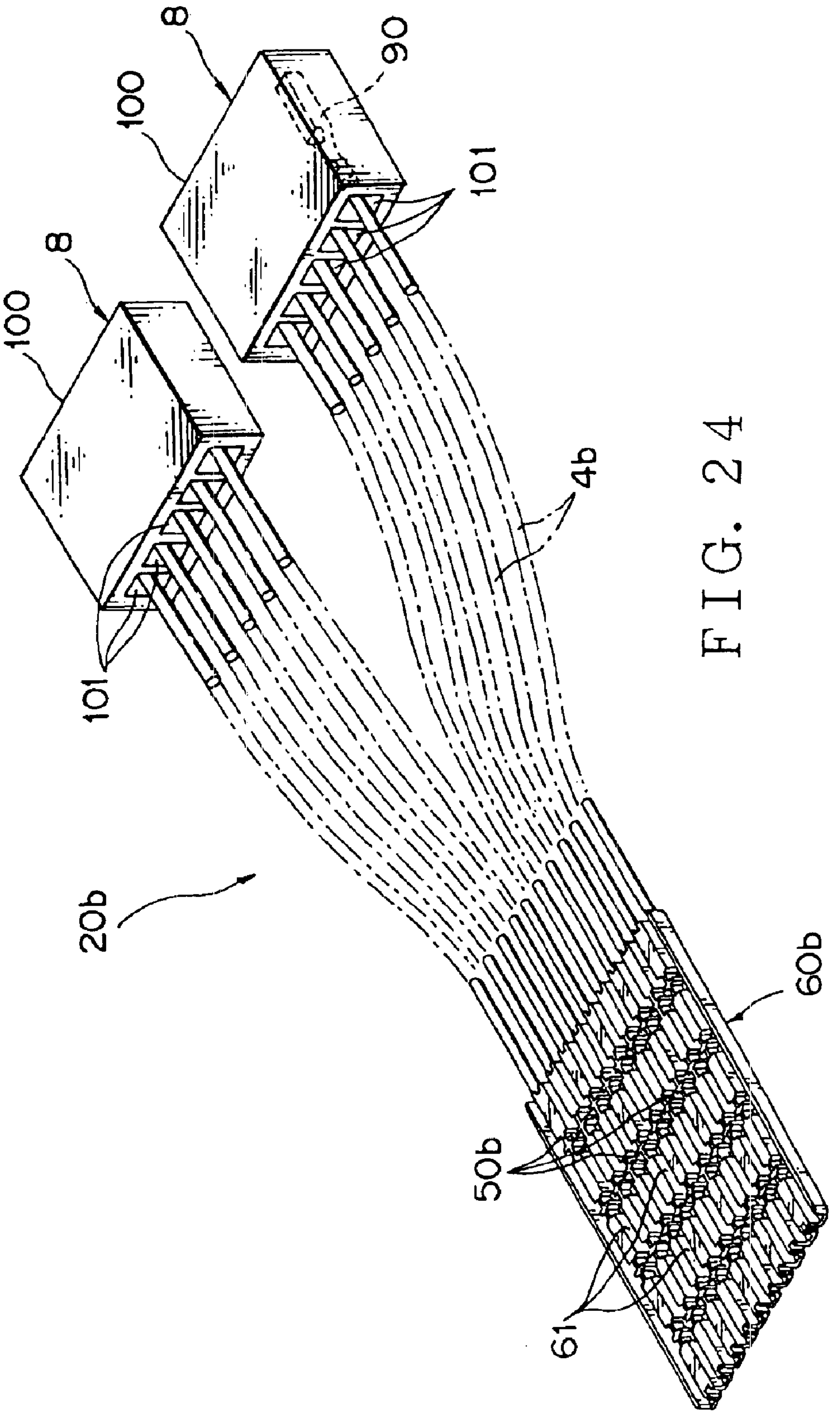
FIG. 24 is a perspective view showing another example of a sub-harness of the wiring harness shown in FIG. 7, and the sub-harness has a press-fit terminal at one end and a crimp terminal at the other end.

Alternatively, the wiring harness 1 may have one or more of sub-harnesses 20*a* and 20*b* each having a press-fit terminal at one end and a crimp terminal at the other end as illustrated in FIGS. 23 and 24. Alternatively, the wiring harness 1 may have one or more of the sub-harnesses 10*a*, 10*b*, and 10*c* and one or more of the sub-harnesses 20*a* and 20*b*.

The wiring harness 1 is generally completed by incorporating the sub-harnesses 10*a*, 10*b*, and 10*c* with the sub-harnesses 20*a* and 20*b* as described later. Note that the sub-harness 10*a*, 10*b*, or 10*c* corresponds to the first sub-harness described in the summary of the invention, and the sub-harness 20*a* or 20*b* corresponds to the second sub-harness.

Figure 8:
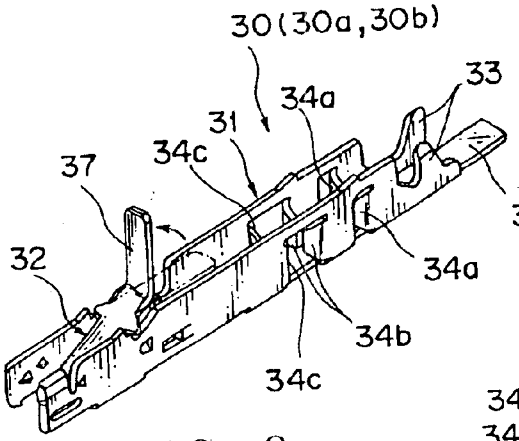
FIG. 8 is a perspective view of a press-fit terminal used in a joint connector of the wiring harness of FIG. 7.
Figure 9:
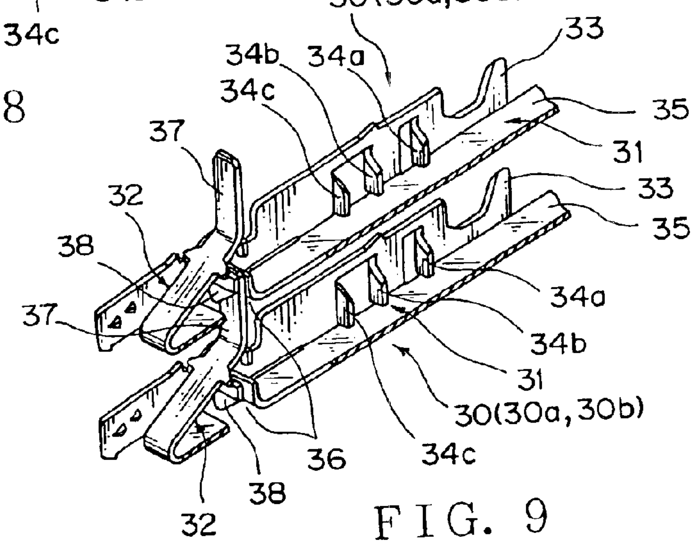
FIG. 9 is a perspective view showing some of the press-fit terminals of FIG. 8, the terminals being layered to electrically connect to each other.
Figure 10:
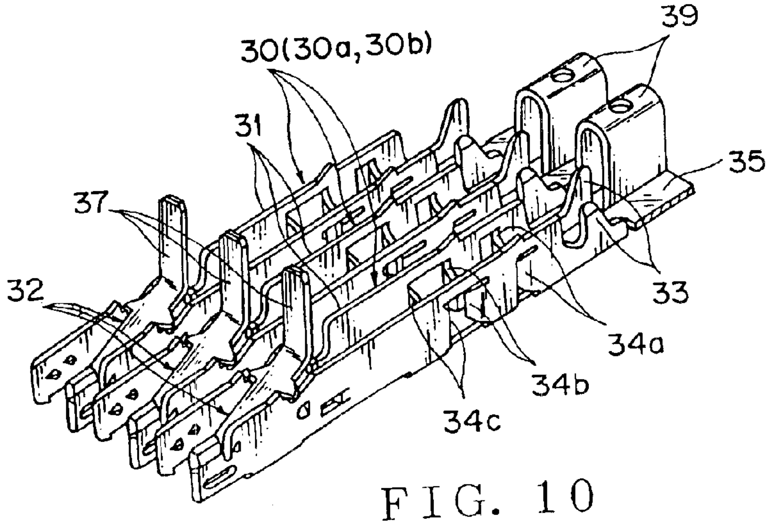
FIG. 10 is a perspective view showing some of the press-fit terminals of FIG. 8, the terminals being disposed in parallel to electrically connect to each other.

The sub-harness 10*a* illustrated in FIG. 20 has a parallel row of electrical cables 4*a*, press-fit terminals 30*a* for a junction box, and terminal fitting housings 40*a*. The press-fit terminal 30*a* is illustrated in FIGS. 8 to 10, and the terminal fitting housing 40*a* that is an isolator is illustrated in FIGS. 11 to 14.

The press-fit terminal 30*a* is fitted to each end of the electrical cable 4*a*. The press-fit terminal 30*a* is received in a terminal accommodation chamber 41, which will be discussed later, of the terminal fitting housing 40*a*.

Figure 15:
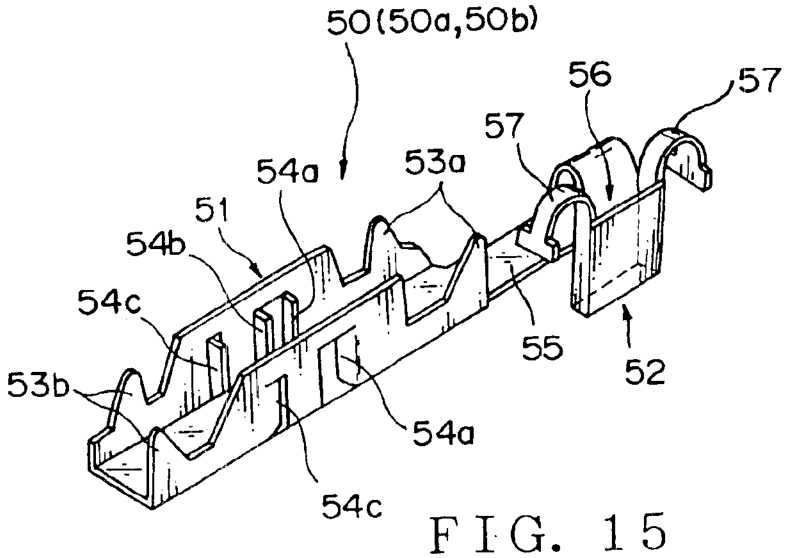
FIG. 15 is a perspective view showing a press-fit terminal used in a junction-box of a wiring harness of FIG. 7.
Figure 17:
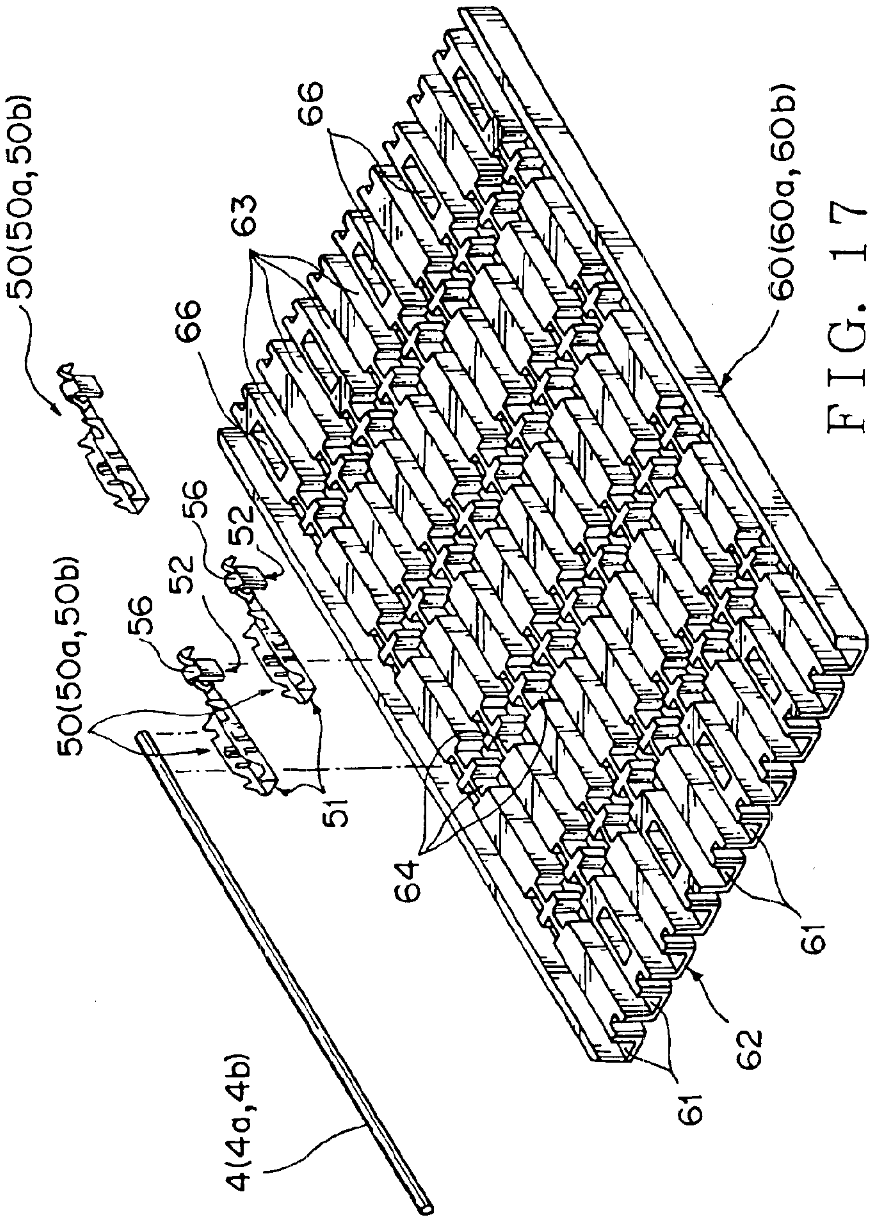
FIG. 17 is a perspective view showing a terminal fitting plate of the wiring harness embodying the present invention and showing in-junction-box disposed press-fit terminals and electrical cables received in the terminal fitting plate.
Figure 16:
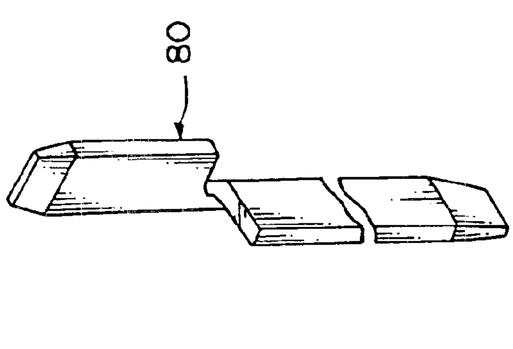
FIG. 16 is a perspective view showing a joint bar of the wiring harness of FIG. 7.
Figure 18:
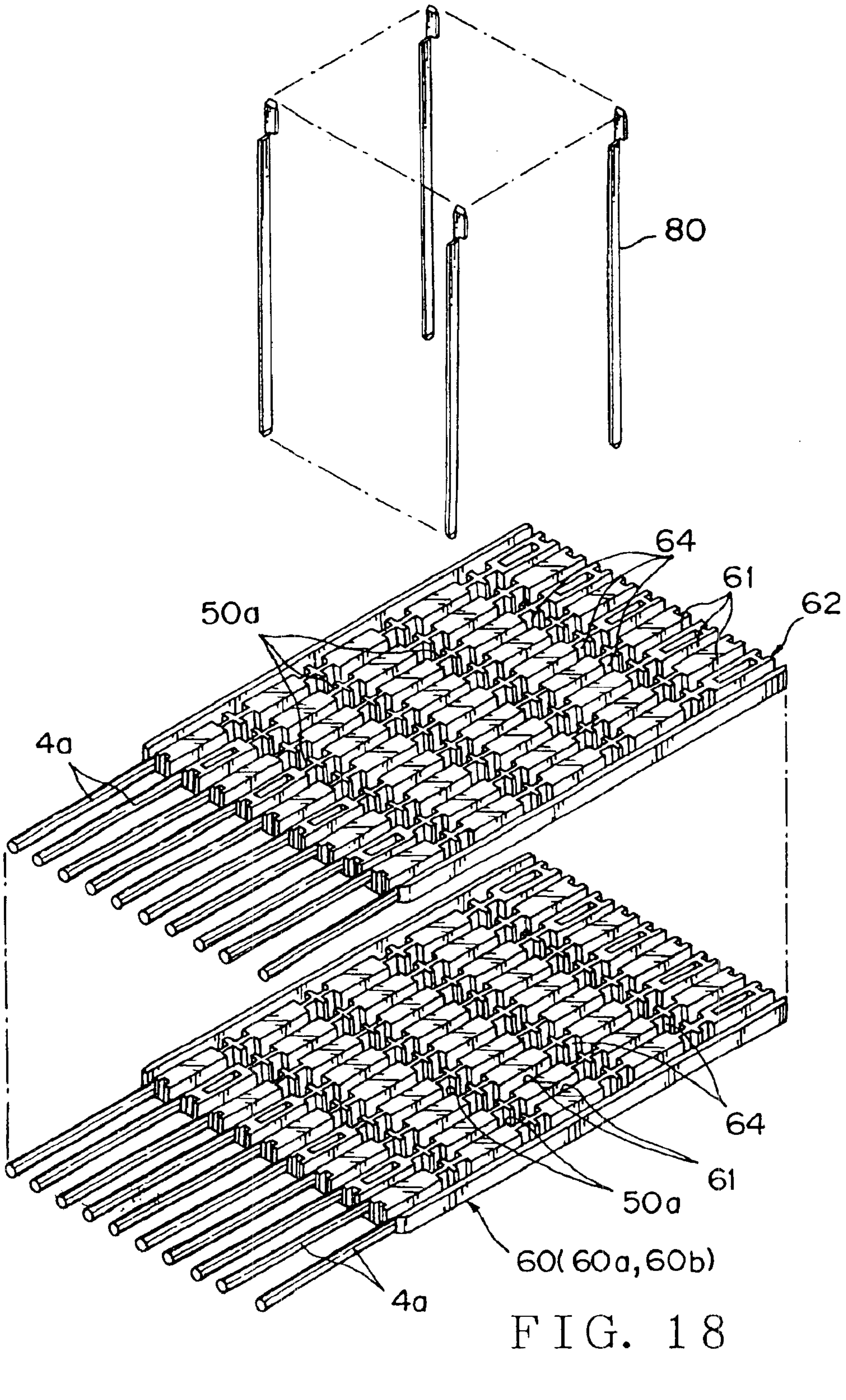
FIG. 18 is a perspective view showing some of the terminal fitting plates of FIG. 17 which are layered with a space therebetween.
Figure 19:
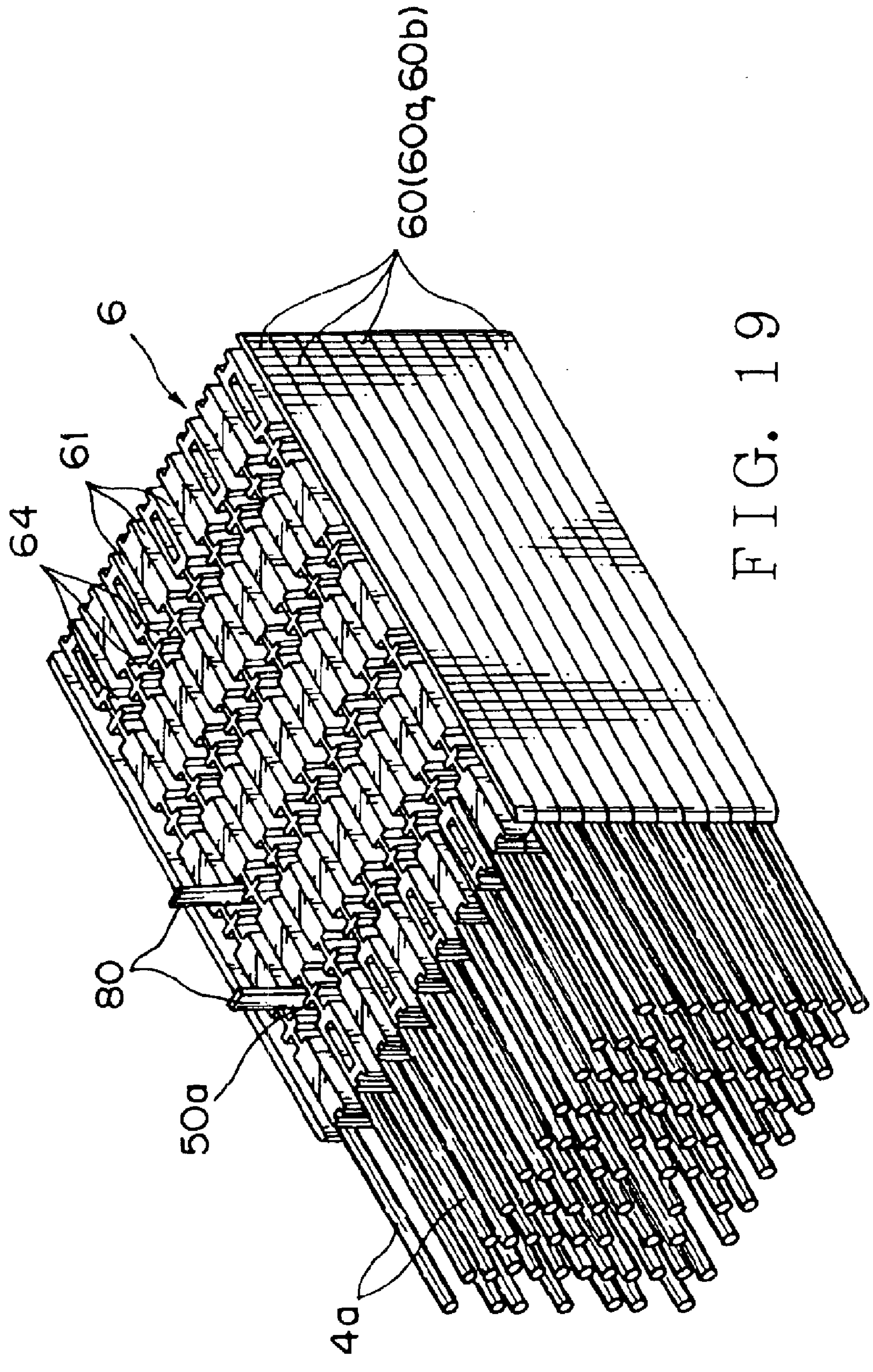
FIG. 19 is a perspective view showing an electrical distribution block defined by securing the terminal fitting plates of FIG. 17 to one another.

The sub-harness 10*b* illustrated in FIG. 21 has a parallel row of electrical cables 4*a*, press-fit terminals 30*a* for a joint connector, a press-fit terminal housing 40*a*, press-fit terminals 50*a* for a junction box, and terminal fitting plates 60*a*. The press-fit terminal 30*a* is also illustrated in FIG. 15, and the terminal fitting plate 60 is also illustrated in FIGS. 17 to 19.

The press-fit terminals 30*a* each are fitted to an end of the electrical cables 4*a*. Each press-fit terminal 30*a* is received in the terminal accommodation chamber 41 of the terminal fitting housing 40*a*. The in-junction-box press-fit terminal 50*a* is fitted to the other end of the electrical cables 4*a*. The press-fit terminals 50*a* each are received in an electrical cable accommodation chamber 61, which will be discussed later, of the terminal fitting plate 60*a*.

The sub-harness 10*c* illustrated in FIG. 22 has a parallel row of electrical cables 4*a*, press-fit terminals 50*a* for a junction box, and terminal fitting plates 60*a*. The press-fit terminal 50*a* is fitted to each end of the electrical cables 4*a*. The press-fit terminal 50*a* is received in an electrical cable accommodation chamber 61 of the terminal fitting plate 60*a*.

In the examples illustrated in FIGS. 20 to 22, the electrical cables 4*a* each are fitted to the terminal fitting housing 40*a* or to the terminal fitting plate 60*a* at each end thereof. However, the sub-harness 10*a*, 10*b*, or 10*c* may have a plurality of the terminal fitting housings 40*a* or the terminal fitting plates 60*a* at each end side of the electrical cables 4*a*.

The electrical cable 4*a* of the sub-harnesses 10*a*, 10*b*, and 10*c* corresponds to the first electrical cable described in the summary of the invention. The press-fit terminal 30*a* and the press-fit terminal 50*a* of the sub-harnesses 10*a*, 10*b*, and 10*c* correspond to the first press-fit terminals described in the invention summary. The terminal fitting housing 40*a* and the terminal fitting plate 60*a* of the sub-harnesses 10*a*, 10*b*, and 10*c* correspond to the first isolators described in the invention summary.

The sub-harness 20*a* illustrated in FIG. 23 has a parallel row of electrical cables 4*b*, press-fit terminals 30*b* for a junction box, terminal fitting housings 40*b*, crimp terminals 90, and connector housings 100. The terminal fitting housing 40*b* functions as an isolator.

Each press-fit terminal 30*b* is fitted to an end of each electrical cable 4*b*. The press-fit terminal 30*b* is received in a terminal accommodation chamber 41 of the terminal fitting housing 40*b*. The crimp terminal 90 is defined by bending a conductor plate. The crimp terminal 90 is crimped to the other end of the electrical cable 4*b*.

The connector housing 100 is made of an insulating synthetic resin material and has a box shape. The connector housing 100 has a plurality of terminal accommodation chambers 101 receiving the crimp terminals 90. The terminal accommodation chamber 101 of the connector housing 100 receives the crimp terminal 90 crimped to the other end of the electrical cable 4*b*. The connector housing 100 and the crimp terminals 90 received in the terminal accommodation chambers 101 constitute the connector 8.

The sub-harness 20*b* illustrated in FIG. 24 has a parallel row of electrical cables 4*b*, press-fit terminals 50*b* for a junction box, a terminal fitting plate 60*b* that functions as an isolator, crimp terminals 90, and a connector housing 100.

Each press-fit terminal 50*b* is fitted to an end of each electrical cable 4*b*. The press-fit terminal 50*b* is received in an electrical cable accommodation chamber 61 of the terminal fitting plate 60*b*. A crimp terminal 90 and a connector housing 100, which are illustrated in FIG. 20, are the same as those of the sub-harness 20*a*. Thus, the same reference numerals are provided for them not to be discussed again.

In the examples illustrated in FIG. 23 and FIG. 24, the electrical cables 4*b* are fitted to the terminal fitting housing 40*a* or the terminal fitting plate 60*a* at an end side thereof, while the electrical cables 4*b* are fitted to two separate connectors 8 at the other end side thereof.

Alternatively, the sub-harness 20*a* or 20*b* of the wiring harness 1 may have one or more than two connectors 8 at the other end side of the electrical cables 4*b*.

The electrical cable 4*b* of the sub-harnesses 20*a* and 20*b* corresponds to the second electrical cable described in the invention summary. The press-fit terminal 30*b* and the press-fit terminal 50*b* for a junction-box of the sub-harness 20*a* and 20*b* correspond to the second press-fit terminals described in the invention summary. The terminal fitting housing 40*b* and the terminal fitting plate 60*b* of the sub-harness 20*a* and 20*b* each correspond to the second isolator described in the invention summary.

Figure 3:
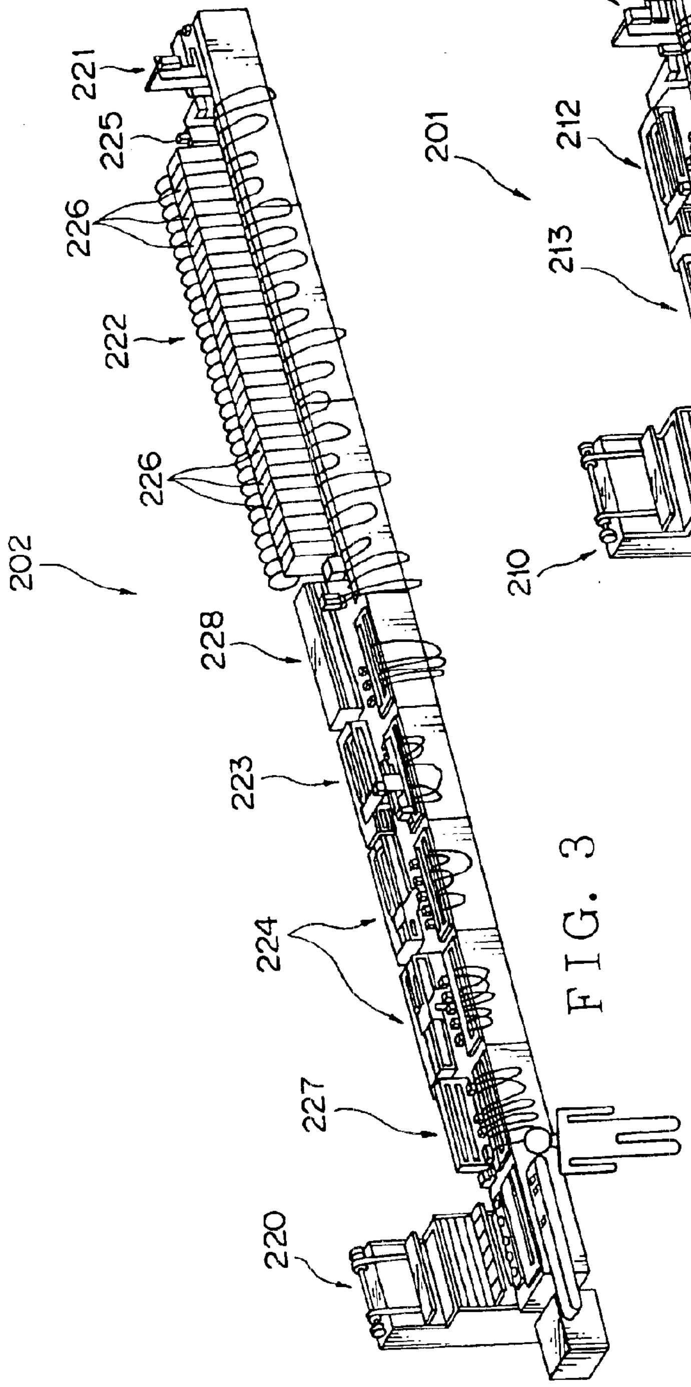
FIG. 3 is a perspective view showing a sub-harness assembling line of -the production apparatus of FIG. 1, which assembles a sub-harness having a press-fit terminal at one end and a crimp terminal at the other end thereof.
Figure 2:
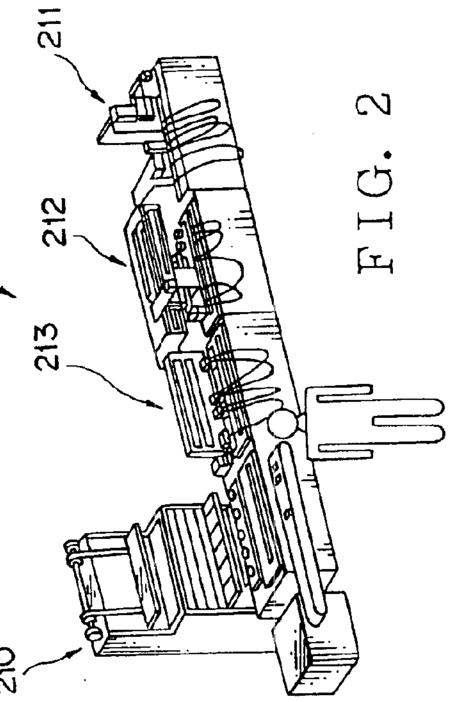
FIG. 2 is a perspective view showing a sub-harness assembling line of the production apparatus of FIG. 1, which fits a press-fit terminal at each end of an electrical cable.

Since press-fit terminals 30*a* and 30*b* have the same configuration as each other, only the press-fit terminal 30*a* will be representatively discussed. The press-fit terminal 30*a* is defined by bending a conductor plate. As illustrated in FIGS. 2 and 3, the press-fit terminal 30*a* has a flat bottom wall 35 on which an electrical cable 4*a* is disposed, an electrical cable connection portion 31, and an electrical contact piece 32.

The electrical cable connection portion 31 has a pair of opposing crimping pieces 33 and three pairs of press fitting blades 34*a*, 34*b*, and 34*c*. The crimping pieces 33 and the press fitting blades 34*a*, 34*b*, and 34*c* are vertically extending relative to the bottom wall 35.

The crimping pieces 33 are bent to hold the electrical cable 4*a* disposed on the bottom wall 35. The press fitting blades 34*a*, 34*b*, and 34*c* receive the electrical cable 4*a* which is inserted between each pair of the blades. Thereby, the blades cut into the sheath of the electrical cable 4*a* to contact the wire core to electrically connect to the electrical cable 4*a*. That is, the press-fitting of the blades for the electrical cable 4*a* is completed.

The electrical contact piece 32 has an opening 36 (see FIG. 9) provided in the bottom wall 35 and has a contact piece 37 raised from the bottom wall 35 and serving as a connection means. The contact piece 37 is changeable from a rising position to a parallel position relative to the bottom wall 35 by a bending work. The parallel position is illustrated by a chain line in FIG. 2.

Note that the contact piece 37 permanently maintains the rising position or the parallel position once the position is determined. As illustrated in FIG. 21, the opening 36 has a resilient contact piece 38 for press-fitting the contact piece 37 to an end of the bottom wall 35.

The press-fit terminals 30*a* for a joint connector are layered with a space therebetween in parallel to the bottom wall 35. The electrical contact piece 32 electrically connects the press-fit terminals 30*a* to one another, since the contact piece 37 of the press-fit terminal 30*a* is inserted into the opening 36 of another upper press-fit terminal 30*a* as illustrated in FIG. 9.

At the same time, the contact piece 37 of the lower press-fit terminal 30*a* is pinched between an end part of the bottom wall 35 and the resilient contact piece 38 of the upper press-fit terminal 30*a*.

Figure 12:
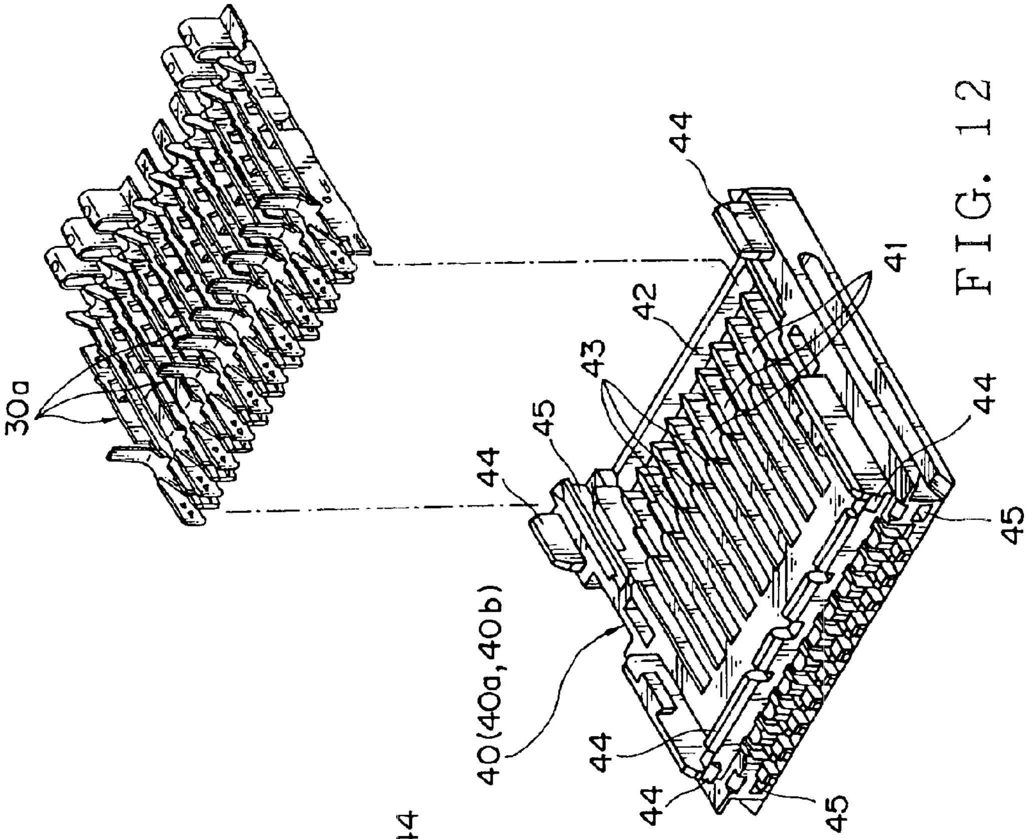
FIG. 12 is a perspective view showing the terminal fitting housing of FIG. 11 and press-fit terminals used in a joint connector, which are just going to be inserted into the housing.

As illustrated in FIG. 12, the press-fit terminals 30*a* is forced into a terminal accommodation chamber 41 of a terminal fitting housing 40*a*. Thereby, the press-fit terminal 30*a* is received in the terminal fitting housing 40*a* to be secured therein.

When received in the terminal accommodation chambers 41, the press-fit terminals 30*a* are disposed in parallel to one another. Adjacent two of the press-fit terminals 30*a* each have a connection piece 39 to electrically connect each other as illustrated in FIG. 10. The connection piece 39 is provided in the side of the electrical cable connection portion 31 of the bottom wall 35.

Since the terminal fitting housings 40*a* and 40*b* have the same configuration as each other, only the terminal fitting housing 40*a* will be representatively discussed. The terminal fitting housing 40*a* is made of an insulating synthetic resin material or the like. As illustrated in FIGS. 11 to 14, the terminal fitting housing 40*a* has a rectangular plate-like main body 42, a plurality of partitions 43 rising from the main body 42, and a plurality of terminal accommodation chambers 41. The partitions 43 are parallel to one another and define the terminal accommodation chambers 41 between them.

Figure 13:
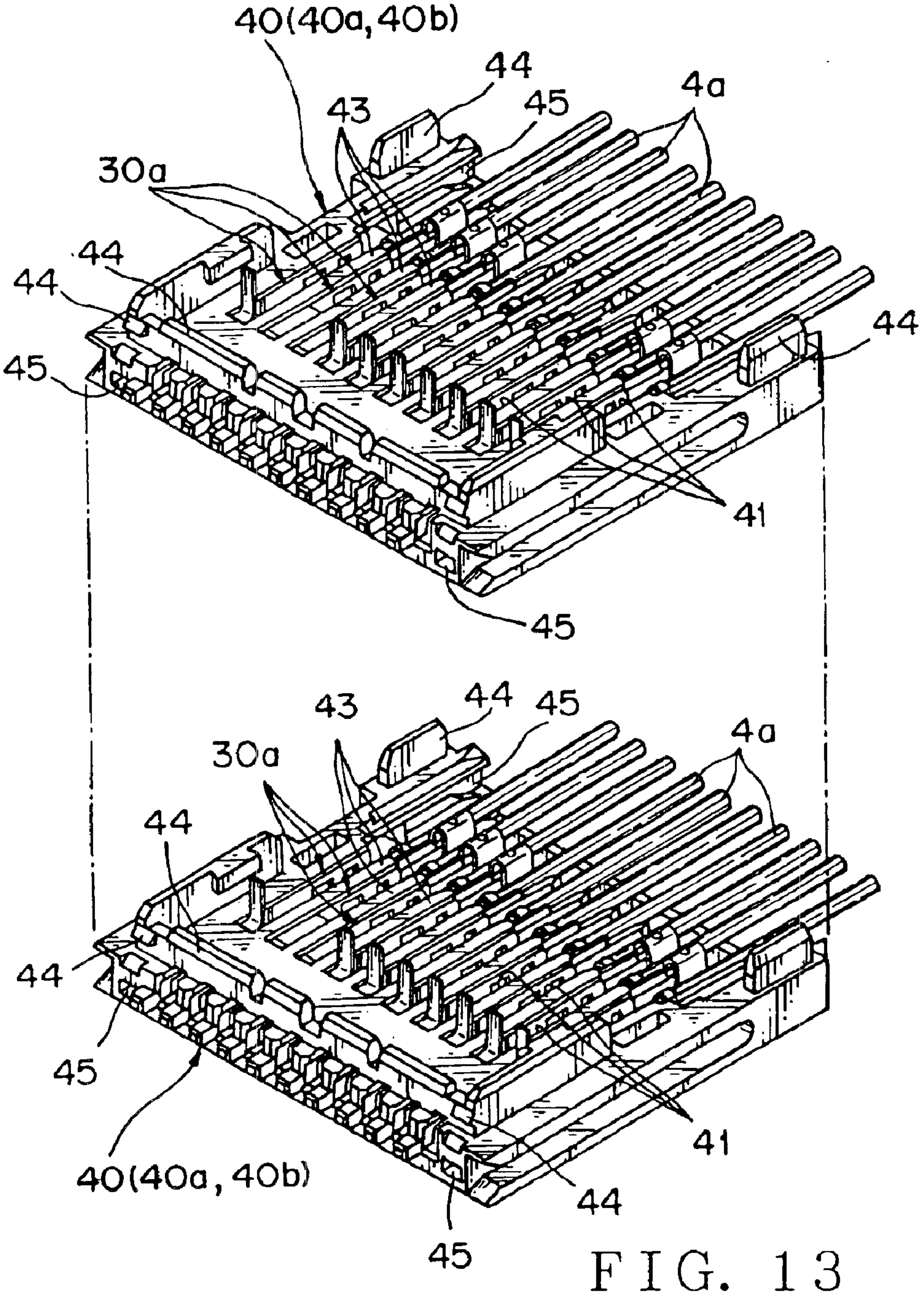
FIG. 13 is a perspective view showing the terminal fitting housings of FIG. 12 layered with a space therebetween.
Figure 14:
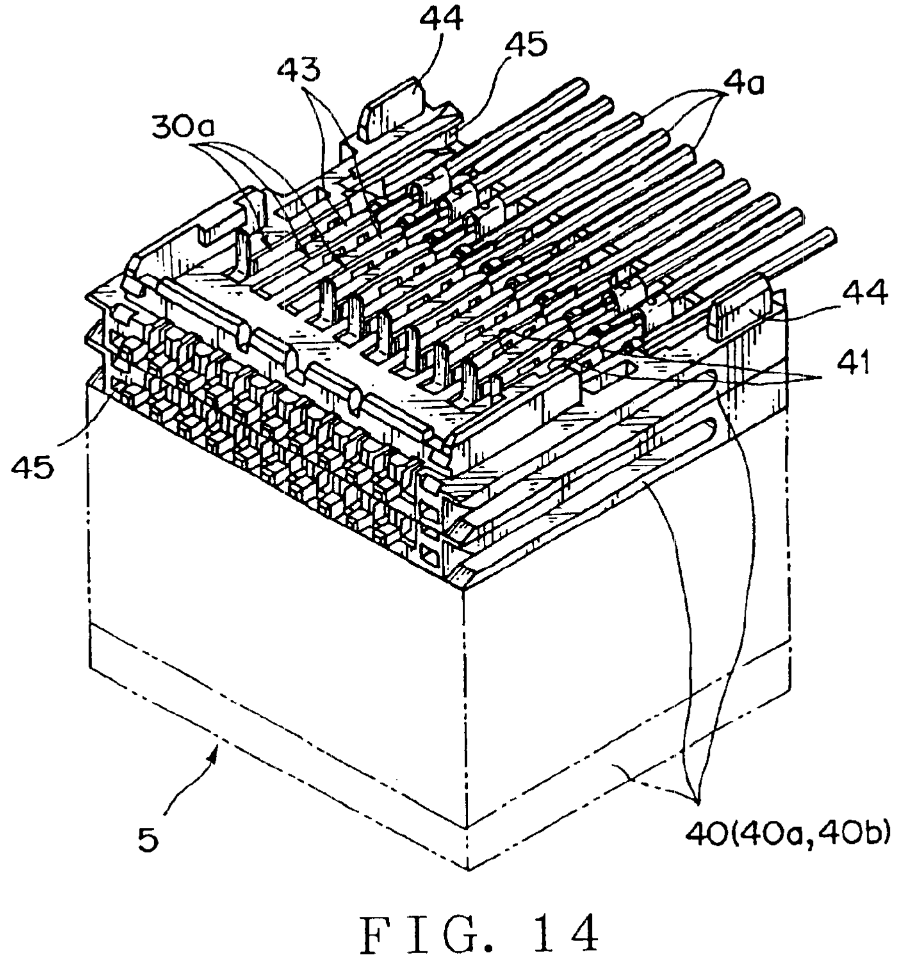
FIG. 14 is a perspective view showing a connector defined by securing the terminal fitting housings of FIG. 12 to one another.

A plurality of the terminal fitting housings 40*a*, each of which has received the press-fit terminals 30*a* in the terminal accommodation chambers 41, are layered with the main bodies being parallel to one another to define the connector 5 as illustrated in FIG. 14. At that time, as illustrated in FIG. 8, the electrical cable 4*a* is fitted to each press-fit terminal 30*a* secured in the housing 40*a*. Then, as illustrated in FIG. 13, the terminal fitting housings 40*a* each of which has received the electrical cable 4*a* are layered.

Figure 11:
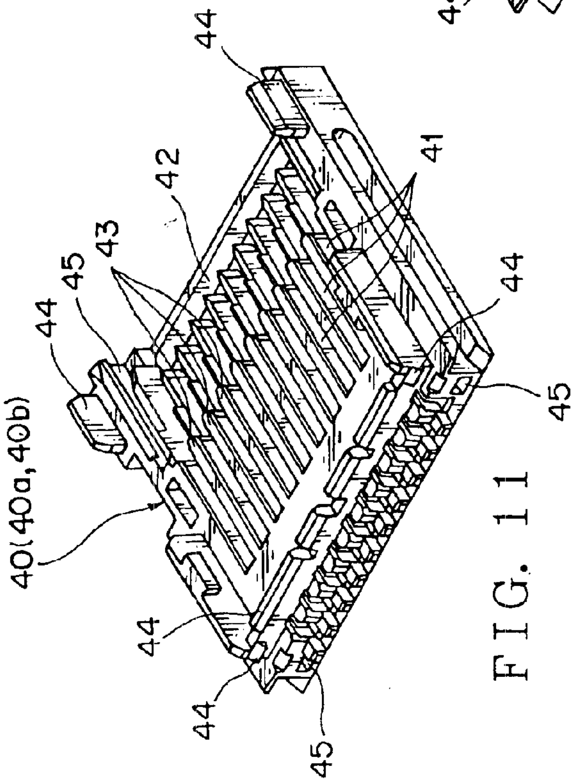
FIG. 11 is a perspective view showing a terminal fitting housing of the wiring harness of FIG. 7.

Each terminal fitting housing 40*a* has a plurality of lock projections 44 and locking recesses 45 for securing them to one another when layered as illustrated in FIGS. 11 and 12. Furthermore, the terminal fitting housing 40*a* has a plurality of openings (not shown) each receiving the contact piece 37 of a lower one of press-fit terminals 30*a* so that the contact piece 37 can pass through the opening 36 of an upper one of press-fit terminals 30*a*.

Since the press-fit terminals 50*a* and 50*b* for a junction box have the same configuration as each other, only the press-fit terminal 50*a* will be representatively discussed hereinafter. The press-fit terminal 50*a* is formed from a conductor plate by a bending work. As illustrated in FIG. 15, the press-fit terminal 50*a* has a flat bottom wall 55 on which the electrical cable 4*a* is disposed, an electrical cable connection portion 51, and an electrical contact piece 52.

The electrical contact piece 51 is received in an electrical cable accommodation chamber 61. The electrical cable connection portion 51 has two pairs of opposing crimping pieces 53*a*, and 53*b* and three pairs of opposing press fitting blades 54*a*, 54*b*, and 54*c*. The crimping pieces 53*a*, and 53*b* and the press fitting blades 54*a*, 54*b*, and 54*c* are vertically extending relative to the bottom wall 55.

The crimping pieces 53*a*, and 53*b* are bent to hold the electrical cable 4*a* disposed on the bottom wall 35. The press fitting blades 54*a*, 54*b*, and 54*c* receive the electrical cable 4*a* which is received between each pair of the blades. Thereby, the blades cut into the sheath of the electrical cable 4*a* to contact the wire core to electrically connect to the electrical cable 4*a*. That is, the press-fitting of the blades for the electrical cable 4*a* is completed.

The electrical contact piece 52 has a contact bar 56 along a side edge of the bottom wall 55. The contact bar 56 is a rectangular hollow piece. The electrical contact piece 52 is disposed such that the hollow of the contact bar 56 communicates with a through hole described later of the terminal fitting plate 60*a*. Through the hollow of the contact bar 56, there is inserted a joint bar 80 illustrated in FIG. 12 for electrical connection thereof. The contact bar 56 has a pair of resilient contact pieces 57 for press-contacting the joint bar 80 thereto.

The joint bar 80 is inserted into the hollows of the contact bars 56 after the terminal fitting plates 60*a* have been layered. Thus, the electrical contact pieces 52 allow electrical connection of the terminals between the terminal fitting plates 60*a* to one another.

A press-fit terminal 50*a* used in a junction-box is forced into one of the electrical cable accommodation chambers 61 of the terminal fitting plate 60*a*. Thereby, The press-fit terminal 50*a* is held by the terminal fitting plate 60*a*. The joint bar 80 is substantially a flat bar made of a conductor metal or the like.

The terminal fitting plates 60*a* and 60*b* have the same configuration as each other. Thus, only the terminal fitting plate 60*a* will be representatively discussed hereinafter. The terminal fitting plate 60*a* is made of an insulating synthetic resin material or the like. The terminal fitting plate 60*a*, as illustrated in FIGS. 17 to 19, has a rectangular plate-like main body 62, a plurality of partitions 63 rising from the main body 62, a plurality of electrical cable accommodation chambers 61, a plurality of receiving recesses 64, and through openings (not shown).

The partitions 63 are arranged in parallel to one another with a space therebetween. The space between two adjacent partitions 63 defines the electrical cable accommodation chamber 61. The recess 64 receives the contact bar 56 of the press-fit terminals 50*a* used in the junction-box.

The receiving recess 64 is defined to provide a wider distance between the two adjacent partitions 63. There are provided a plurality of the receiving recesses 64 along a longitudinal direction of the electrical cable accommodation chambers 61. The through hole is provided for each receiving recess 64. The hole passes through the main body 62.

As illustrated in FIGS. 17 and 18, the terminal fitting plate 60*a* receives the press-fit terminals 50*a* in the electrical cable accommodation chambers 61 and the receiving recesses 64. Then, the plate-like main bodies 62 are layered in parallel. The joint bars 80 are inserted into the associated through holes and the hollows of the contact bars 56, so that the terminal fitting plates 60*a* define a distribution block 6 as illustrated in FIG. 19.

At the same time, the press-fit terminals 50*a* each are connected to the electrical cable 4*a*. The terminal fitting plate 60*a* has a plurality of lock projections (not shown) and locking holes 66 engageable with the lock projections. The engagement of the lock projections with the locking holes 66 secures the terminal fitting plates 60*a* to each other.

The wiring harness 1 is completed by layering the terminal fitting housings 40*a* or 40*b* or the terminal fitting plates 60*a* or 60*b*, which are consisting of the sub-harnesses 10*a*, 10*b*, 10*c*, 20*a*, or 20*b*, to secure them to each other according to a predetermined pattern.

In the terminal fitting housings 40*a* and 40*b* which have been layered to be secured to each other, the contact pieces 37 electrically connect the in-joint-connector disposed press-fit terminals 30*a* and 30*b* held by different terminal fitting housings 40*a* and 40*b*.

In terminal fitting plates 60*a* and 60*b* which have been layered to be secured to each other, the joint bars 80 electrically connect the press-fit terminals 50*a* and 50*b* held by different terminal fitting plates 60*a* and 60*b* to each other. The mutual connection of the different press-fit terminals 50*a* and 50*b* results in mutual electrical connection of the electrical cables 4*a* and 4*b* fitted with the different terminals 50*a* and 50*b*.

That is, in the wiring harness 1, a connection portion for electrically connecting the electrical cables 4*a* and 4*b* to each other is defined by the layering of the terminal fitting housings 40*a* and 40*b* or the terminal fitting plates 60*a* and 60*b* and by the connection of the terminals 30*a*, 30*b*, 50*a*, and 50*b* through the joint bars 80.

Figure 1:
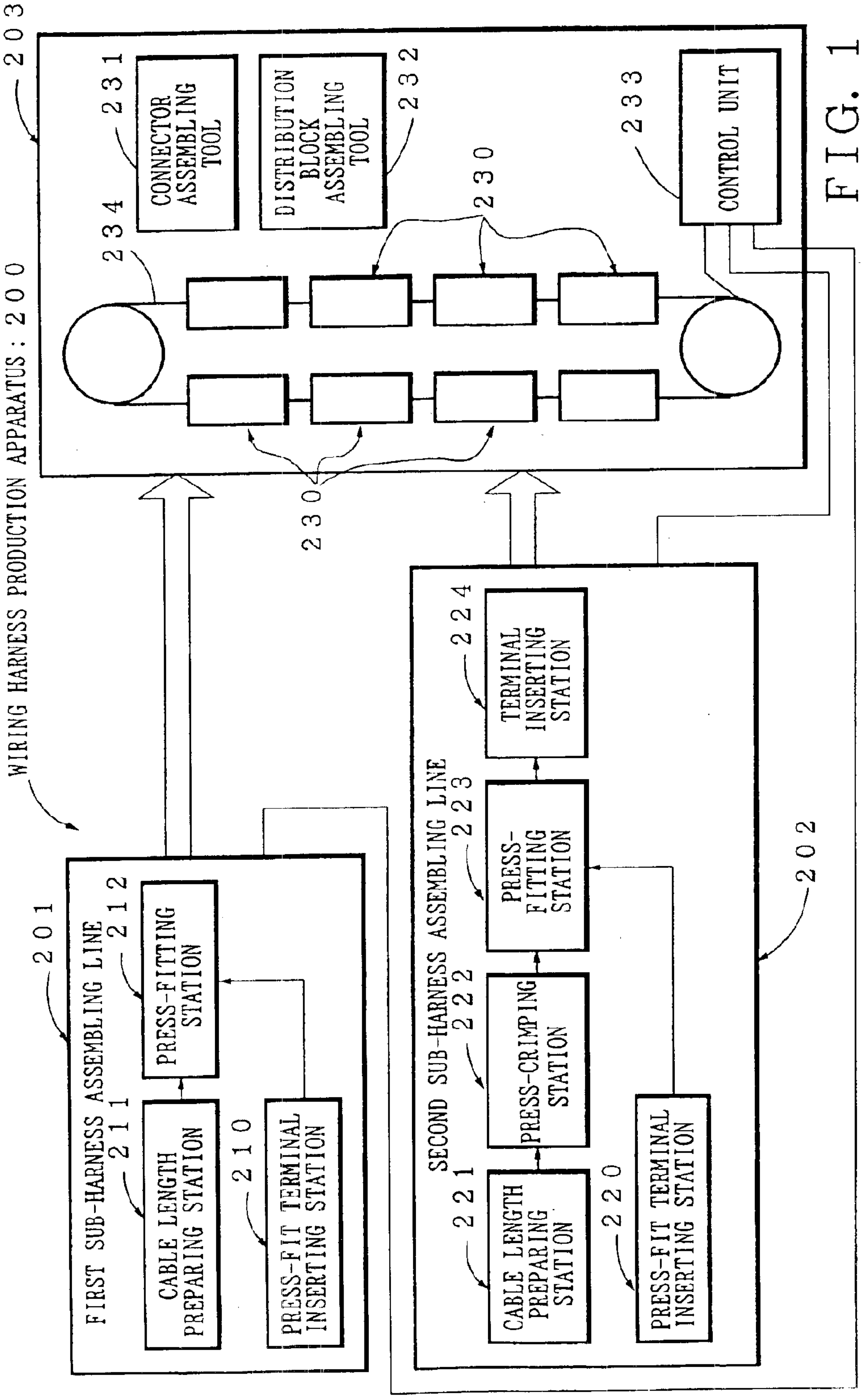
FIG. 1 is a block diagram showing a concept of a wiring harness production apparatus of an embodiment according to the present invention.

Next, referring to FIGS. 1 to 6, a production apparatus 200 of the wiring harness 1 will be discussed. The wiring harness production apparatus 200 has a first sub-harness assembling line and a second sub-harness assembling line as illustrated in FIG. 1. The first sub-harness assembling line is an assembling line 201 for press-fitting a terminal to each end of an electrical cable. The second sub-harness assembling line is an assembling line 202 for press-fitting a terminal to one end of an electrical cable and for crimping another terminal to the other end of the electrical cable.

The sub-harness assembling line 201 assembles the sub-harness 10*a*, 10*b*, or 10*c* each having a press-fit terminal at each end thereof. A plurality of the sub-harness assembling lines 201 are provided, and the number of the assembling lines 201 is the same as the different type number of the sub-harnesses 10*a*, 10*b*, and 10*c* used for the wiring harness 1. That is, each sub-harness assembling line 201 assembles one type of the sub-harnesses 10*a*, 10*b*, and 10*c*.

As illustrated in FIGS. 1 and 2, the sub-harness assembling line 201 has a press-fit terminal inserting station 210, a predetermined-length electrical cable preparing station 211, a press-fitting station 212, and a first sub-check station 213.

The cable preparing station 211, and the press-fitting station 212, and the first sub-check station 213 are sequentially positioned toward the wire harness assembling line 203.

The press-fit terminal inserting station 210 forces the press-fit terminals 30*a* and 50*a* into the terminal accommodation channels 41 and the electrical cable receiving channels 61 of the housing 40*a* and the plate 60*a* to obtain the sub-harnesses 10*a*, 10*b*, and 10*c*. A terminal fitting station 220 fits the press-fit terminals 30*a* and 50*a* in the housing 40*a* and the plate 60*a*.

Figure 5A:
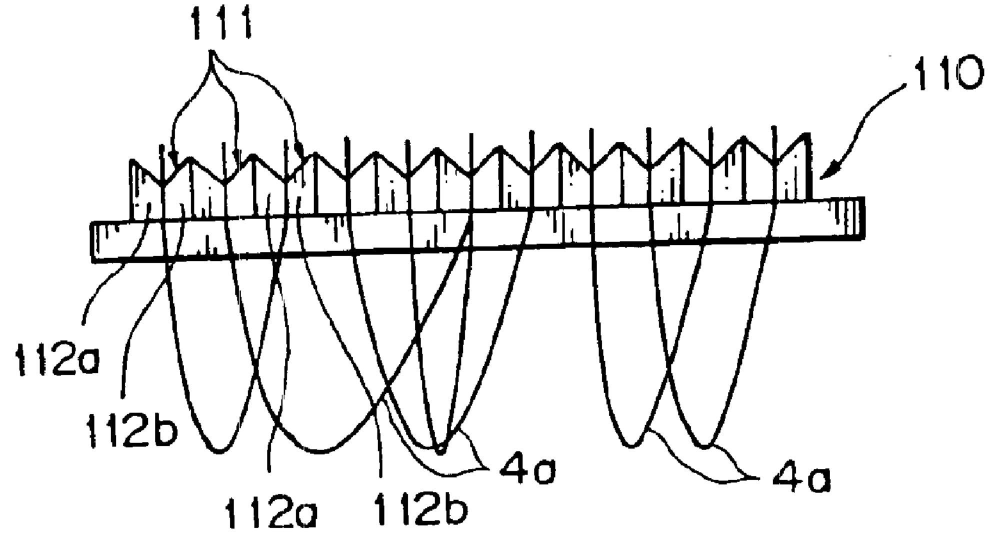
FIGS. 5A and 5B each are a schematic view showing a step for assembling a sub-harness in the sub-harness assembling line of FIG. 2.

The cable preparing station 211 cuts an electrical cable supplied from an electrical cable supply station (not shown) into a cable having a predetermined length. The predetermined-length electrical cables are held by a retainer bar 110 as illustrated in FIG. 5A. The electrical cable supply station has a plurality of reels each for winding one of different types of the electrical cables.

Figure 5B:
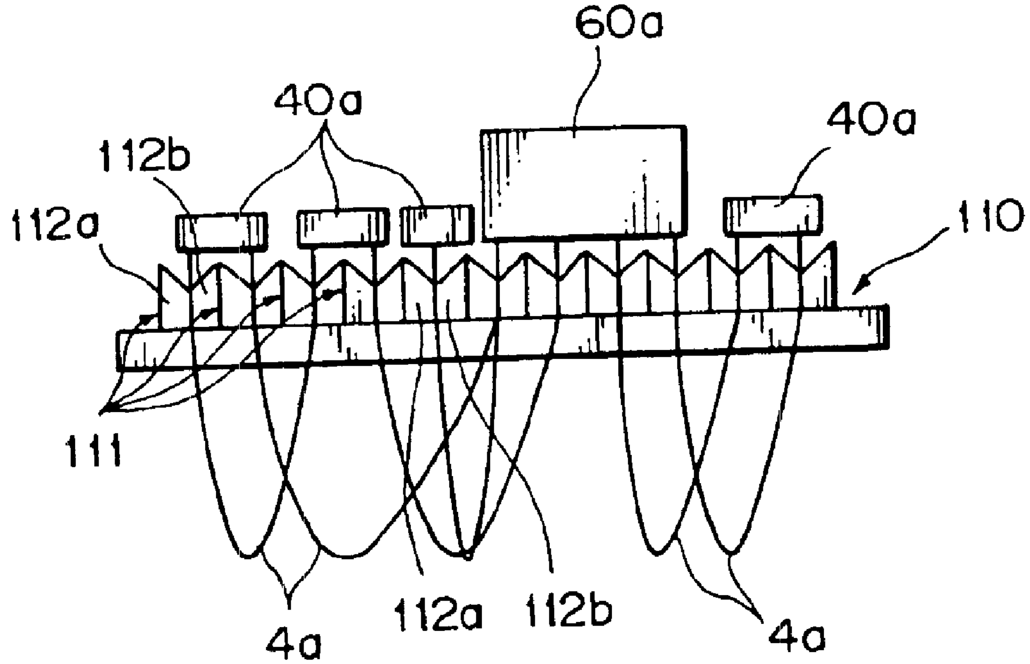

The retainer bar 110 has a plurality of clips 111 for holding the electrical cables as illustrated in FIGS. 5A and 5B. The electrical cable clips 111 align with one another in a direction. Each electrical cable clip has a pair of pinching pieces 112*a* and 112*b* for pinching the electrical cable 4*a* therebetween.

As illustrated in FIG. 5B, the press-fitting station 212 press-fits each end of the electrical cable 4*a* to the press-fit terminal 30*a* or 50*a* received in the housing 40*a* or the plate 60*a* according to a predetermined pattern.

The first sub-check station 213 provides an electrical continuity check for the sub-harnesses 10*a*, 10*b*, and 10*c* which have been obtained through the cable preparing station 211 and the press-fitting station 212. The electrical continuity check determines acceptance or rejection of each press-fit terminal 30*a* or 50*a* which is checked of electrical continuity with other terminals 30*a* and 50*a*.

The sub-harness assembling line 201 strikes the electrical cables 4*a*, which have been obtained by the cable preparing station 211, into the retainer bar 110. Then, Each retainer bar 110 having the cables is transferred toward the press-fitting station 212.

The press-fitting station 212 also receives the housing 40*a* and the plate 60*a*, which have been mounted with the press-fit terminals 30*a* or 50, from the press-fit terminal fitting station 210. The press-fitting station 212 press-fits the electrical cable 4*a* held by the retainer bar 110 to the press-fit terminal 30*a* or 50*a*. Thereafter, each retainer bar 110 is transferred toward the sub-check station 213.

The sub-check station 213 checks the electrical continuity of each of the sub-harnesses 10*a*, 10*b*, and 10*c* to determine acceptance or rejection thereof.

The sub-harness assembling line 201 assembles the sub-harnesses 10*a*, 10*b*, and 10*c*, while the electrical cables 4*a* are transferred toward the wiring harness assembling line 203.

The sub-harness assembling line 202 assembles the sub-harnesses 20*a* and 20*b* each having a press-fit terminal and a crimp terminal. The number of the sub-harness assembling lines 202 is equal to the number of types of the sub-harnesses 20*a* and 20*b* used for the wiring harness 1. That is, a different one of the sub-harness assembling lines 202 corresponds to a different type of the sub-harnesses 20*a* and 20*b*.

As illustrated in FIGS. 1 and 3, the sub-harness assembling line 202 has the press-fit terminal inserting station 220, a predetermined-length electrical cable preparing station 221, a press-crimping station 222, a press-fitting station 223, a terminal inserting station 224, and a second sub-check station 227, which are sequentially disposed toward the wiring harness assembling line 203.

The press-fit terminal inserting station 220 press-fits the press-fit terminals 30*b* and 50*b* to the terminal accommodation channels 41 and the electrical cable receiving channels 61 of the housing 40*b* and the plate 60*b* used in the sub-harness 20*a* and 20*b*.

Figure 6A:
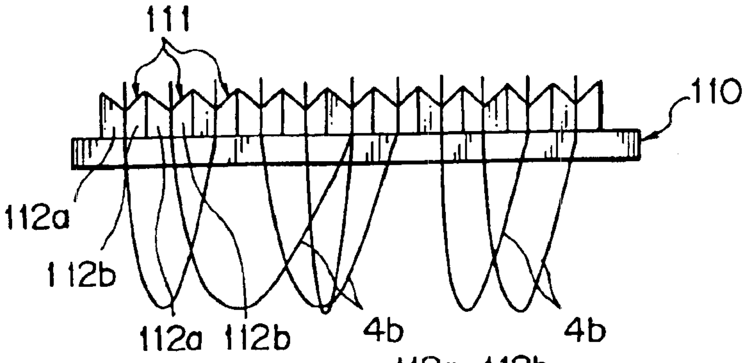
FIGS. 6A and 6D each are a schematic view showing a step for assembling a sub-harness in the sub-harness assembling line of FIG. 3.

The cable preparing station 221 cuts an electrical cable supplied from an electrical cable supply station (not shown) to obtain a predetermined-length one. The obtained cables are held by the retainer bar 110 as illustrated in FIG. 6A. The cable preparing station 221 has a stripping machine 225 for stripping one end of the electrical cable 4*b* held by the retainer bar 110.

The electrical cable supply station has a plurality of reels each for winding a different type of electrical cables. Note that a retainer bar 110 used in the sub-harness assembling line 202 has the same configuration as that of the sub-harness assembling line 201. Thus, the retainer bar 110 will not be discussed again.

The press-crimping station 222 has a plurality of crimping machines 226. The crimping machine 226 has a fixed lower molding die and an upper molding die movable relative to the lower die. The crimping machine 226 holds the stripped end of the electrical cable 4*b* and the crimp terminal 90 between the upper and lower molding dies to crimp the electrical cable 4*b* to the crimp terminal 90.

The crimping machines 226 align with one another in a direction in which there are disposed the cable preparing station 221, the press-crimping station 222, and the press-fitting station 223, and the terminal inserting station 224. The aligned crimping machines 226 are different from one another in the upper and lower molding dies and the distance therebetween according to the types of the electrical cable 4*b* and the crimp terminal 90.

Figure 6B:
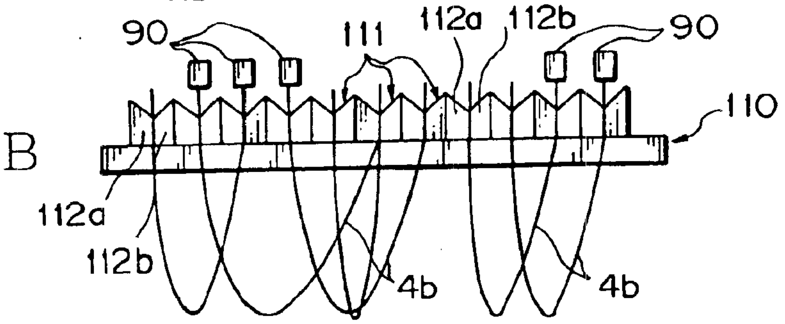

As illustrated in FIG. 6B, the press-crimping station 222 crimps the crimp terminal 90 to one end of the electrical cable 4*b* held by the clips 111 of the retainer bar 110.

Figure 6C:
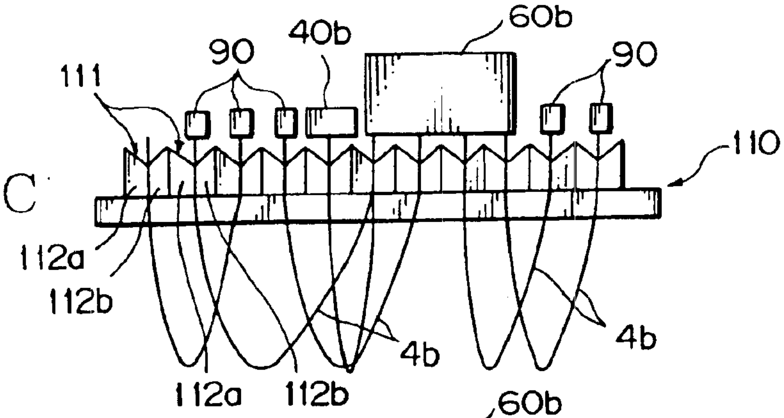

As illustrated in FIG. 6C, the press-fitting station 223 press-fits one of the press-fit terminals 30*b* and 50*b*, which is received in the housing 40*b* or the plate 60*b*, to the other end of the electrical cable 4*b* according to a predetermined pattern.

Figure 6D:
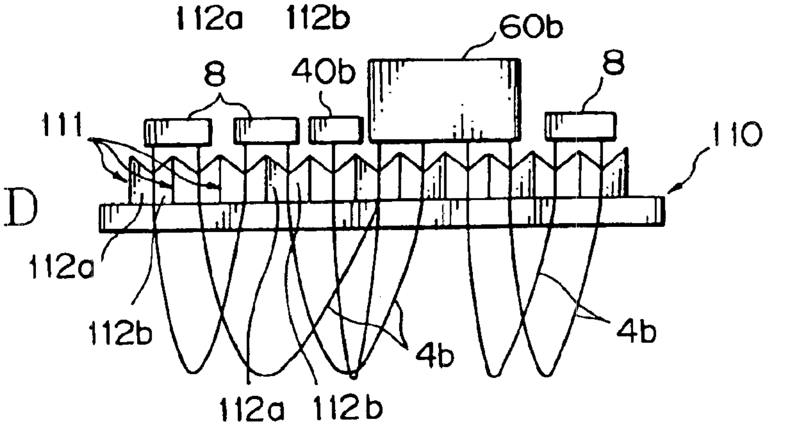

As illustrated in FIG. 6D, the terminal inserting station 224 inserts the crimp terminal 90 crimped to the electrical cable 4*b* into the terminal accommodation chamber 101 of the connector housing 100. Thereby, the terminal inserting station 224 fits the connector housing 100 to the other end of the electrical cable 4*b*.

The second sub-check station 227 makes an electrical continuity check for each sub-harness 20*a* or 20*b* obtained through the cable preparing station 221, the press-crimping station 222, the press-fitting station 223, and the terminal inserting station 224. The electrical continuity check determines acceptance or rejection of each press-fit terminal 30*b*, 50*b*, or 90 which is checked of electrical continuity with other terminals 30*b*, 50*b*, or 90.

The sub-harness assembling line 202 strikes the electrical cables 4*b*, which have been obtained by the cable preparing station 221, into the retainer bar 110. Meanwhile, one end of the electrical cable 4*b* is striped to crimp the crimp terminal 90 thereto. Each retainer bar 110 having the electrical cables 4*b* is transferred toward the press-crimping station 222.

The press-crimping station 222 press-fits the crimp terminal 90 to the striped end of the electrical cable 4*b*, and then each retainer bar 110 is transferred toward the press-fitting station 223. The press-fitting station 223 also receives the housing 40*b* and the plate 60*b* mounted with the press-fit terminals 30*b* and 50*b* from the press-fit terminal inserting station 220. The press-fitting station 223 fits the striped end side of the electrical cable 4*b* held by the retainer bar 110 to the press-fit terminal 30*b* or 50*b*.

The press-fitting station 223 outputs each retainer bar 110 toward the terminal inserting station 224. The terminal inserting station 224 inserts each crimp terminal 90 into the terminal accommodation chamber 101 of the connector housing 100.

Then, each retainer bar 110 is transferred toward the sub-check station 227. The sub-check station 227 makes an electrical continuity check to determine acceptance or rejection of the sub-harnesses 20*a* and 20*b*.

Thus, the sub-harness assembling line 202 assembles the sub-harnesses 20*a* and 20*b* while the electrical cable 4*b* is transferred to come near the wiring harness assembling line 203.

In the embodiment, the sub-harness assembling line 202 has an electrical cable rearranging station 228 as illustrated in FIG. 3. The rearranging station 228 is disposed between the press-crimping station 222 and the press-fitting station 223.

The rearranging station 228 rearranges the electrical cables 4*b* held by the retainer bar 110 so that the stations 223, 224 may carry out smooth press-fit and insertion steps. The rearranging station 228 once removes the electrical cables 4*b* from the clips 111 to rearrange them, and the rearranging station 228 strikes again the electrical cables 4*b* into the clips 111.

As illustrated in FIG. 1, the wiring harness assembling line 203 has a plurality of wiring boards 230, a press-fit connector assembling tool, a plurality of press-fit-type distribution block assembling tools, and a wiring harness check station 233.

The wiring board 230 is a plate movable along a rail 234 on a floor of a factory. There are provided eight wiring boards 230 in FIG. 1.

Figure 4:
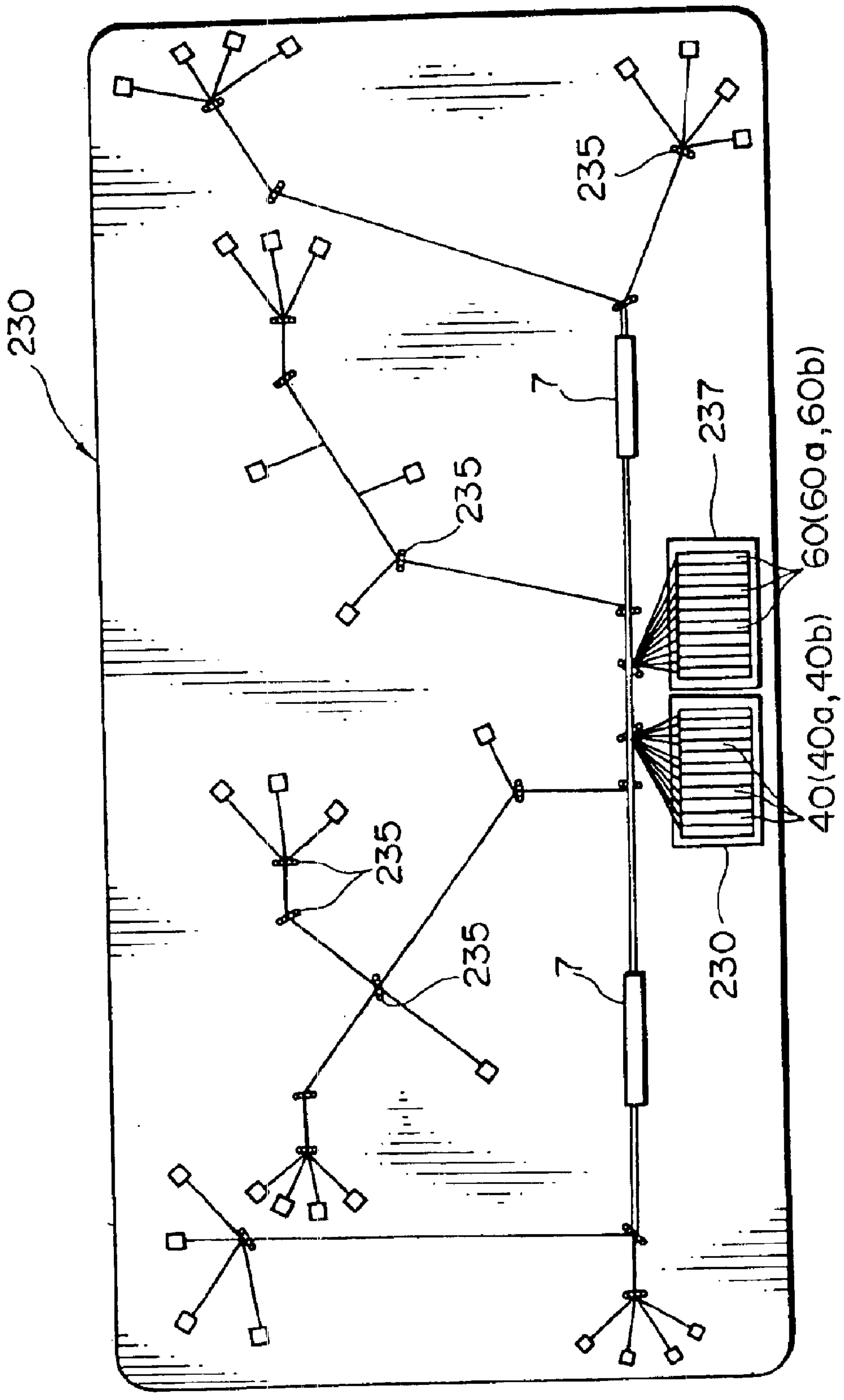
FIG. 4 is a plan view showing a wiring board used in a wiring harness assembling line of the production apparatus of FIG. 1.

On the wiring board 230, there is pictured a wiring arrangement pattern for arranging the electrical cables 4, the connectors 8, and other additional fittings including the protectors 7. As illustrated in FIG. 4, the wiring board 230 also has a plurality of bundling clips 235, a plurality of press-fit housing supports 236, and press-fit plate supports 237.

The clip 235 bundles some of the sub-harnesses 10*a*, 10*b*, 10*c*, 20*a*, and 20*b*. The clips 235 support the sub-harnesses 10*a*, 10*b*, 10*c*, 20*a*, or 20*b* according to the wiring arrangement pattern to assemble the wiring harness.

The press-fit housing support 236 supports the housings 40*a* and 40*b* of the sub-harnesses 10*a*, 10*b*, 20*a*, while the housing main plate bodies 42 are spaced from each other.

The press-fit housing support 237 supports the housings 60*a* and 60*b* of the sub-harnesses 10*b*, 10*c*, and 20*b*, while the housing main plate bodies 62 are spaced from each other.

The connector assembling tool 231 is disposed near the traveling course or rail 234 of the wiring board 230. The connector assembling tool 231 press-fits the housings 40*a* and 40*b* held by the housing support 236 to one another so that the lock projections 44 engage with the locking recesses 45. The connector assembling tool 231 assembles the connectors 5.

The distribution block assembling tool 232 is disposed near the traveling rail 234 of the wiring board 230. The distribution block assembling tool 232 press-fits the plates 60*a* and 60*b* held by the plate support 237 to each other so that the lock projection may engage with and lock in the locking hole 66. The distribution block assembling tool 232 inserts the joint bars 80 into the predetermined through holes to contact the contact bars 56 of the press-fit terminals 50*a* and 50*b* for assembling the distribution line unit 6.

The control unit 233 is a calculation unit having known devices including a RAM, a ROM, and a CPU. The control unit 233 controls the wiring harness assembling line 203. The control unit 233 communicates with the sub-harness assembling line 201 and the sub-harness assembling line 202 to control them. The control unit 233 controls the whole wiring harness assembling apparatus 100.

The control unit 233 controls the sub-harness assembling line 201 and the wiring harness assembling line 203 while the following equation 1 having parameters t, T1, and N is applied. N, t, and T1 are sequentially the number of the wiring boards 230, a time required for the wiring board 230 to complete one circulation travel on the rail 234, and a first assembling time required for the sub-harness assembling line 201 to assemble the sub-harnesses 10*a*, 10*b*, and 10*c* used in a single wiring harness 1.

$$t \div N \approx T1 \quad \text{equation 1}$$

The control unit 233 controls the sub-harness assembling line 201 and the wiring harness assembling line 203 while the following equation 2 having parameters t, T2, and N is applied. T2 is a second assembling time required for the sub-harness assembling line 202 to assemble the sub-harnesses 20*a* and 20*b* used in a single wiring harness 1.

$$t \div N \approx T2 \quad \text{equation 2}$$

That is, the control unit 233 controls the whole wiring harness production apparatus such that the first assembling time T1 is almost equal to the second assembling time T2.

Meanwhile, a time T for the wiring harness assembling line 203 to output a completed wiring harness 1 is calculated from the following equation 3.

$$t \div N = T \quad \text{equation 3}$$

The sub-harness assembling line 201 is different from the sub-harness assembling line 202 in the number of steps for assembling the sub-harnesses 10*a*, 10*b*, 10*c*, 20*a*, and 20*b*. Thus, the first assembling time T1 is different from the second assembling time T2. Generally, the second assembling time T2 is longer than the first assembling time T1. It is not practical to reduce a time for each step of the sub-harness assembling lines 201, 202.

Thus, the control unit 233 generally controls the whole wiring harness production apparatus 1 with the time interval T being determined based on a longer one of the first and second assembling times T1 and T2. That is, the control unit 233 controls the traveling speed of the wiring boards 230 based on the longer of the assembling times T1 and T2 for the sub-harness assembling lines 201, 202 to assemble the sub-harnesses 10*a*, 10*b*, 10*c*, 20*a*, and 20*b*.

The control unit 233 controls the wiring harness production apparatus 200 with satisfying the equations 1 and 2, so that the wiring harness assembling line 203 outputs a completed wiring harness 1 while the sub-harness assembling lines 201, 202 assemble the sub-harnesses 10*a*, 10*b*, 10*c*, 20*a*, and 20*b* which are just necessary for a single wiring harness 1.

Thus, the sub-harness assembling lines 201 and 202 assemble the wiring sub-harness 10*a*, 10*b*, 10*c*, 20*a*, and 20*b* based on the time interval T for outputting a complete wiring harness 1 from the wiring harness assembling line 203.

The embodiment satisfies the equations 1, 2, and 3 to assemble the wiring harness 1, so that the wiring harness assembling line 203 assembles the wiring harness 1 while the sub-harness assembling lines 201 and 202 supply the sub-harnesses 10*a*, 10*b*, 10*c*, 20*a*, and 20*b* to the wiring harness assembling line 203.

Thus, in assembling the wiring harness 1, only a required number of the sub-harnesses 10*a*, 10*b*, 10*c*, 20*a*, and 20*b* can be continuously supplied to the wiring harness assembling line 203.

Accordingly, it is unnecessary to stock a larger amount of the sub-harnesses 10*a*, 10*b*, 10*c*, 20*a*, and 20*b* near the wiring harness assembling line 203. This allows a reduced space for stocking the sub-harnesses 10*a*, 10*b*, 10*c*, 20*a*, and 20*b* near the wiring harness assembling line 203, also reducing the total space of the wiring harness production apparatus 200.

In addition, the sub-harness assembling lines 201 and 202 assemble the sub-harnesses 10*a*, 10*b*, 10*c*, 20*a*, and 20*b* while the electrical cables 4*a* and 4*b* are transferred toward the wiring harness assembling line 203.

Thus, when the sub-harnesses 10*a*, 10*b*, 10*c*, 20*a*, and 20*b* have been just assembled, they are located near the wiring harness assembling line 203. This allows an efficient transfer of the sub-harnesses 10*a*, 10*b*, 10*c*, 20*a*, and 20*b* for the wiring harness assembling line 203. That is, the sub-harnesses 10*a*, 10*b*, 10*c*, 20*a*, and 20*b* can be smoothly supplied to the wiring harness assembling line 203.

Accordingly, the assembling time for the wiring harness 1 is reduced, allowing an improved productivity of the wiring harness 1.

In the aforementioned embodiment, for assembling the sub-harnesses 10*a*, 10*b*, and 10*c*, there are provided the cable preparing station 211 and the press-fitting station 212. However, the stations 211 and 212 may be replaced by a random terminal press-fit machine 300 disclosed in Japanese Patent Application Laid-open No. H. 7-296933, which is partially illustrated in FIG. 26. Note that the random terminal press-fit machine 300 may include the press-fit machine described in the summary of the invention.

In the present invention, the sub-harness assembling line 202 may assemble plural types of the sub-harnesses 10*a*, 10*b*, and 10*c*. The wiring board 230 may be mounted on an automatically running bogie traveling along a desirable way on a floor of a factory.

Note that the wiring harness 1 according to the present invention may have an electrical cable having a crimp terminal fitted at each end thereof.

What is claimed is:

1. An apparatus (200) in combination with a wiring harness (1) having a plurality of first sub-harnesses (10*a*) and a plurality of second sub-harnesses (20*a*), the apparatus in combination with the wiring harness comprising:

a first sub-harness assembling line (201) for assembling a first sub-harness, the first sub-harness having a plurality of electrical cables (4*a*), a plurality of first press-fit terminals (30*a*), and a first isolator (40*a*), the first press-fit terminal being joined to each end of the first electrical cable, the first isolator holding the first press-fit terminals positioned at one end of the first sub-harness, a second sub-harness assembling line (202) for assembling a second sub-harness, the second sub-harness having a plurality of second electrical cables (4*b*), a plurality of second press-fit terminals (30*b*), a plurality of crimp terminals (90), a connector housing (8) for accommodating the crimp terminals, and a second isolator (40*b*) supporting the second press-fit terminals, the second press-fit terminal being connected to one end of the second electrical cable, the crimp terminal being connected to the other end of the second electrical cable, and a wiring harness assembling line (203) for layering the isolators of the first and second sub-harnesses to complete the wiring harness, wherein, when any of the first and second isolators are layered, the press-fit terminals held by different ones of the isolators can be connected to one another, and wherein the first and second sub-harnesses are assembled in the first and second sub-harness assembling lines based on an assembling time required for assembling the wiring harness in the wiring harness assembling line to reduce a space for stocking the first and second sub-harnesses.

2. The apparatus (200) in combination with the wiring harness set forth in claim 1, wherein the wiring harness assembling line (203) outputs one of the wiring harnesses at a time interval, and the first and second sub-harness assembling lines (201), (202) can output a specified number of the first and second sub-harnesses within the time interval, the specified number of the sub-harnesses being required to assemble one of the wiring harnesses.

3. The apparatus (200) in combination with the wiring harness set forth in claim 2, wherein the first sub-harness assembling line (201) takes a first time required for assembling a first number of the first sub-harnesses required to assemble the single wiring harness, and the second sub-harness assembling line (202) takes a second time required for assembling a second number of the second sub-harnesses required to assemble the single wiring harness, said time interval being determined based on a longer one of the first and second times.

4. The apparatus (200) in combination with the wiring harness set forth in claim 3, wherein the first time is substantially equal to said time interval, and the second time is also substantially equal to said time interval.

5. The apparatus in combination with the wiring harness set forth in claim 1 wherein the first and second sub-harness assembling lines assemble the first and second sub-harness while the first and second electrical cable are being transferred to come near the wiring harness assembling line.

* * * * *